US009607517B2

(12) United States Patent
Schräbler et al.

(10) Patent No.: US 9,607,517 B2
(45) Date of Patent: Mar. 28, 2017

(54) METHOD AND DEVICE FOR THE POSITION DETERMINATION OF OBJECTS BY MEANS OF COMMUNICATION SIGNALS, AND USE OF THE DEVICE

(71) Applicant: Continental Teves AG & Co., Frankfurt (DE)

(72) Inventors: Sighard Schräbler, Karben (DE); Ulrich Stählin, Eschborn (DE); Marc Menzel, Weimar/Lahn (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/359,816

(22) PCT Filed: Nov. 21, 2012

(86) PCT No.: PCT/EP2012/073223
§ 371 (c)(1),
(2) Date: May 21, 2014

(87) PCT Pub. No.: WO2013/076136
PCT Pub. Date: May 30, 2013

(65) Prior Publication Data
US 2014/0350793 A1 Nov. 27, 2014

(30) Foreign Application Priority Data

Nov. 21, 2011 (DE) .................. 10 2011 086 697
Dec. 1, 2011 (DE) .................. 10 2011 087 554

(51) Int. Cl.
*G08G 1/16* (2006.01)
*B62D 6/00* (2006.01)
(Continued)

(52) U.S. Cl.
CPC ............... *G08G 1/16* (2013.01); *B62D 6/00* (2013.01); *G01S 7/006* (2013.01); *G01S 13/02* (2013.01);
(Continued)

(58) Field of Classification Search
CPC .......... G01S 7/414; G01S 7/415; G01S 13/00; G01S 13/04; G01S 13/06; G01S 13/36; G01S 13/38; G01S 13/70
(Continued)

(56) References Cited

U.S. PATENT DOCUMENTS 3,604,805 A * 9/1971 Scott .............................. 356/28
4,733,238 A 3/1988 Fiden
(Continued)

FOREIGN PATENT DOCUMENTS

DE 195 43 813 A1 5/1997
DE 10 2007 048 809 A1 7/2008
(Continued)

OTHER PUBLICATIONS

Siemens, Vehicle-to-X (V2X) Communication Technology 2015, pp. 1-5.*
(Continued)

*Primary Examiner* — Tyler J Lee
(74) *Attorney, Agent, or Firm* — Brinks Gilson & Lione

(57) ABSTRACT

The invention relates to a method for the position determination of objects (62, 707, 84, 96) by means of communication signals, in which a transceiver capable of wireless communication transmits communication signals, the transceiver (51) being capable of simultaneous transmission and reception, and wherein the communication signals are at least partially reflected as reflection signals on at least one object (62, 707, 84, 96) in a signal propagation zone and the transceiver (51) receives the reflection signals. The method
(Continued)

is characterized in that phase information of the reflection signals or communication signals are determined. The invention further relates to a corresponding device and to a use of the device.

32 Claims, 15 Drawing Sheets

(51) Int. Cl.
G01S 13/02 (2006.01)
G01S 7/00 (2006.01)
G01S 13/93 (2006.01)
G01S 7/288 (2006.01)

(52) U.S. Cl.
CPC ............ *G01S 13/931* (2013.01); *G08G 1/161* (2013.01); *G01S 2007/2886* (2013.01); *G01S 2013/936* (2013.01); *G01S 2013/9321* (2013.01); *G01S 2013/9325* (2013.01); *G01S 2013/9332* (2013.01); *G01S 2013/9342* (2013.01); *G01S 2013/9346* (2013.01); *G01S 2013/9382* (2013.01)

(58) Field of Classification Search
USPC ........ 701/2, 23, 28, 36, 41, 300–302; 342/6, 342/27, 29, 90, 102, 104, 114, 118
See application file for complete search history.

(56) References Cited

U.S. PATENT DOCUMENTS

| | | | |
|---|---|---|---|
| 5,113,191 A * | 5/1992 | Knepper et al. ............... 342/119 |
| 5,510,794 A * | 4/1996 | Asbury et al. .................. 342/42 |
| 5,517,196 A * | 5/1996 | Pakett et al. .................... 342/70 |
| 6,437,561 B1 * | 8/2002 | Bartingale et al. ...... 324/207.22 |
| 6,614,384 B2 * | 9/2003 | Hall et al. ....................... 342/28 |
| 6,930,638 B2 | 8/2005 | Lloyd et al. |
| 7,205,933 B1 | 4/2007 | Snodgrass |
| 8,159,344 B2 | 4/2012 | Wu |
| 8,314,732 B2 * | 11/2012 | Oswald et al. ................. 342/90 |
| 2002/0053982 A1 | 5/2002 | Baugh et al. |
| 2005/0195383 A1 * | 9/2005 | Breed et al. ................. 356/4.01 |
| 2005/0278098 A1 * | 12/2005 | Breed ............................. 701/45 |
| 2006/0238407 A1 | 10/2006 | Bourdelais et al. |
| 2010/0019964 A1 * | 1/2010 | Huang .................. G01M 17/06 342/357.31 |
| 2010/0103020 A1 * | 4/2010 | Wu ................................. 342/28 |
| 2011/0148710 A1 * | 6/2011 | Smid et al. ................... 342/394 |

FOREIGN PATENT DOCUMENTS

| | | |
|---|---|---|
| DE | 10 2007 058 192 A1 | 6/2009 |
| DE | 10 2008 061 304 A1 | 7/2009 |
| DE | 10 2009 019 905 A1 | 11/2010 |
| DE | 10 2010 029 744 A1 | 2/2011 |
| DE | 10 2011 077 998 A1 | 1/2012 |
| DE | 10 2011 079 052 A1 | 3/2012 |
| EP | 1 040 364 B1 | 4/2005 |

OTHER PUBLICATIONS

PCT International Search Report—Mar. 5, 2013.
German Examination Report—Feb. 28, 2013.
Wikipedia—Map Matching.
Potential and Limitations of Froward-Looking Bistatic SAR— I. Wlaterscheid et al.
Parametrizaton of Joint OFDM-based Radar and Communication Systems for Vehicular Applications—Martin Braun et al.
Christian Sturm, et al., "Waveform Design and Signal Processing Aspects for Fusion of Wireless Communications and Radar Sensing", Proceedings of the IEEE, New York, Jul. 1, 2011, pp. 1236-1259; vol. 99, No. 7.
Joo-Han Song, et al., "Secure Location Verification for Vehicular Ad-Hoc Networks", Proceedings of the IEEE, Globecom, 2008.

* cited by examiner

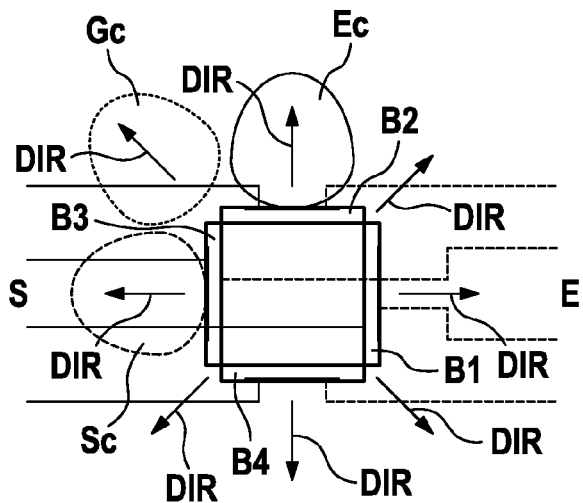
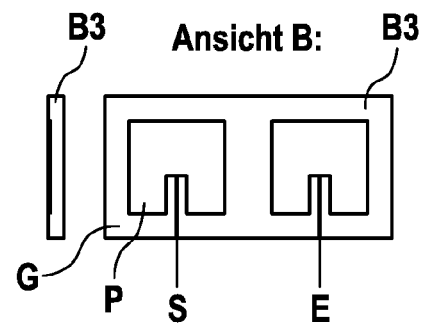
Fig. 16a          Fig. 16b
| DIR | A1 | A2 | A3 |
|---|---|---|---|
| 0° | E | Z | S |
| 60° | Z | E | S |
| 120° | S | E | Z |
| 180° | S | Z | E |
| 240° | Z | S | E |
| 300° | E | S | Z |
| DIR | B1 | B2 | B3 | B4 |
|---|---|---|---|---|
| 0° | SE | Z | Z | Z |
| 45° | S | E | Z | Z |
| 90° | Z | SE | Z | Z |
| 135° | Z | S | E | Z |
| 180° | Z | Z | SE | Z |
| 225° | Z | Z | S | E |
| ... | | | | |
Fig. 17

METHOD AND DEVICE FOR THE POSITION DETERMINATION OF OBJECTS BY MEANS OF COMMUNICATION SIGNALS, AND USE OF THE DEVICE

CROSS REFERENCE TO RELATED APPLICATIONS

This application claims priority to German Patent Application Nos. 10 2011 086 697.3, filed on Nov. 21, 2011; 10 2011 087 554.9, filed on Dec. 1, 2011; and PCT/EP2012/073223, filed Nov. 21, 2012.

FIELD OF THE INVENTION

The invention relates to a method for position determination of objects by means of communication signals, and a device for position determination of objects by means of communication signals and their use.

BACKGROUND

In the prior art, it is already known for motor vehicles to be equipped with sensor devices suitable for sensing the environment. In particular, mono or stereo camera devices, radar devices and ultrasound devices are already present in a multiplicity of new vehicles as standard basic equipment or are at least available as special equipment. Furthermore, wirelessly transmitting vehicle-to-X communication devices are known in the prior art which enable an information exchange with surrounding vehicles and surrounding infrastructure. Although vehicle-to-X communication devices of this type are currently still not in widespread use in motor vehicles, a rapid market penetration is expected over the next few years, which, in particular, will also be promoted by legal provisions and regulations.

In this connection, a central control device for a plurality of assistance systems provided in a motor vehicle is known from DE 10 2007 058 192 A1 which is at least partially equipped with environment sensors, wherein, according to DE 10 2007 058 192 A1, a telematics system is also understood to be an environment sensor. The central control device is connected at data level to the individual assistance systems and verifies the plausibility of the information of individual environment sensors by means of the information of different environment sensors. For example, the image information of a camera may confirm the distance measurement of a radar sensor. Individual sensor information can thus be confirmed and is present in redundant form. Such a coupling of individual signals of different sensors is also known as sensor fusion.

DE 10 2011 077 998 A1 discloses a method for information validation of a vehicle-to-X message by means of environment sensors. A vehicle-to-X communication device and the environment sensors of a motor vehicle interwork here in such a way that the information content of vehicle-to-X information is reliably validated by means of the environment sensors even if the available environment sensors capture the information content described by the vehicle-to-X information only briefly or with constant interruptions. Vehicle-to-X information can thus be validated or rejected as insufficiently trustworthy even in situations with only restricted environment-sensing possibilities.

A method and a system for validating a vehicle-to-X message are known from DE 10 2011 079 052 A1. Here, a wirelessly transmitted vehicle-to-X message is received by an antenna arrangement having at least two antenna elements, wherein the electromagnetic field strength of the vehicle-to-X message is sensed by the antenna elements with different power densities due to different, direction-dependent receive characteristics of the antenna elements. From the ratio of the different power densities in the antenna elements, the receiver determines a position of the transmitter relative to the receiver. The vehicle-to-X message furthermore contains an absolute position of the transmitter based on GPS data, from which the receiver of the vehicle-to-X message calculates a further position of the transmitter relative to the receiver via its own absolute position. By means of a comparison of the two relative positions, the received vehicle-to-X message can then be validated if the two positions match one another, or rejected if the positions differ from one another.

However, the methods and devices known from the prior art have the disadvantage that the largest possible number of different sensors of different sensor types are required for the reliable sensing of objects and, in particular, for validating a detected object, which in turn incurs high equipment costs for motor vehicles of this type.

The object of the invention is therefore to propose a method which allows the environment sensor equipment cost incurred according to the prior art to be reduced without entailing information losses.

This object is achieved according to the invention by the method for position determination of objects by means of communication signals as described herein.

SUMMARY AND INTRODUCTORY DESCRIPTION OF THE INVENTION

Referring to FIG. 18, a method 1810 according to the invention for position determination of objects by means of communication signals, in which a transceiver capable of wireless communication transmits communication signals 1820, wherein the transceiver is capable of simultaneous transmission and reception and wherein the communication signals 1830 are at least partially reflected as reflection signals on at least one object in a signal propagation zone, the transceiver receives the reflection signals 1840. The method 1810 is characterized in that phase information of the reflection signals and communication signals is determined 1850.

Through the use of phase information instead of intensity information, the method according the invention is more robust and less susceptible to interferences, since, in contrast to intensity information, the phase information is less readily affected by interference. For example, only a slight shadowing of the transceiver suffices for the communication signals emanating from behind the shadowing to be captured only in significantly weakened form. However, the phase information remains unaffected by shadowing of this type.

The method is advantageously carried out in a vehicle-to-X communication device.

It is furthermore preferably provided that the transceiver evaluates received communication signals and received reflection signals temporally in parallel. As a result, phase information of the communication signals and phase information of the reflection signals can also be compared with one another. Moreover, a temporally immediate evaluation is thus guaranteed, which is important in a motor vehicle, in particular for safety-related applications such as e.g. specific driver assistance systems.

Furthermore, it is preferable for the communication signals still to be transmitted while the associated reflection signals are already being received once more. A method of this type is also referred to as a pulsed continuous-wave method. Since the communication signals transmitted for communication purposes are normally very long compared with conventional radar signals, the case will often occur due to the high propagation speed of electromagnetic waves wherein a reflection signal already arrives again at the transceiver while the latter is still transmitting the communication signal. Through corresponding design of the hardware, e.g. by means of a circulator, a loop conductor, a directional coupler or by means of electrically independent antennas for transmitting and receiving, the reflection signal can be processed and the communication signal can continue to be transmitted in this case also.

It is preferably provided that a distance and/or a direction to at least one object is determined from the phase information 1860.

The invention thus describes a method which enables a position determination of objects at a 360° angle around the transceiver with comparatively simple means. This position determination angle or position determination area is created by the angle of radiation of the communication signals, which is normally 360°. The method according the invention thus offers a significantly greater position determination angle or position determination area than, for example, radar sensors used for similar purposes.

A further advantage is that the number of environment sensors required according to the prior art in a vehicle which carries out the method according the invention can be reduced, since a communication device already present can be used additionally for the position determination of objects in the environment of the vehicle. The sensor-side equipment cost of a vehicle of this type can thus be reduced without entailing information losses.

A further advantage arises in that, precisely in the initial introduction of vehicle-to-X communication devices into vehicles, i.e. when there are only a very small number of communication participants for vehicles capable of vehicle-to-X communication, a tangible added value is nevertheless created for the vehicle customer, since the latter can undertake a position determination of objects in his environment via the method according to the invention regardless of the number of vehicles capable of vehicle-to-X communication in his environment. The method according to the invention is therefore suitable for speeding up the penetration of the market, particularly in the initial period, following the initial introduction of vehicle-to-X communication devices into vehicles.

In order to validate a position determined using the method according to the invention, said position can preferably be overlaid on a digital roadmap in a following step, wherein only a determined position that can be assigned to a road marked on the digital roadmap is validated. Determined positions that are located on a road and therefore tend to be relevant to a road user such as a motor vehicle are validated in every case. Conversely, determined positions that cannot be assigned to a road are rejected. The risk of rejecting a position correctly determined using the method according to the invention is comparatively low. And even if a correctly determined position were rejected in this connection, this would not normally be significant, since only those objects that are similarly located on the road are normally important to a road user.

The transceiver appropriately communicates by means of at least one of the following communication types:

WLAN communication, in particular according to IEEE 802.11p,
WiFi Direct communication,
ISM communication (Industrial, Scientific, Medical Band), in particular via a radio-link-enabled locking device,
BLUETOOTH® (IEEE 802.15.1) communication,
ZigBee communication,
UWB communication (Ultra Wide Band),
WiMax communication (Worldwide Interoperability for Microwave Access),
Remote Keyless Entry communication,
Mobile radio communication, in particular GSM, GPRS, EDGE,
UMTS communication,
LTE communication, and
Infrared communication.

The mobile-radio-based communication means are particularly appropriately allocated to an automatic emergency call module. The listed communication types offer different advantages and disadvantages in terms of their communication characteristics, depending on the type, wavelength and data protocol used. WLAN connections enable e.g. a high data transmission rate and a fast connection setup. ISM connections, on the other hand, offer only a lower data transmission rate, but are outstandingly suitable for data transmission around obstacles. Infrared connections in turn similarly offer a low data transmission rate. Finally, mobile radio connections are not affected by obstacles and offer a good data transmission rate. However, the connection setup of mobile radio connections is comparatively slow.

It is preferably provided that the phase information comprises differential phases of the reflection signals. In every case, the difference formation offers the advantage that information which is present in equal measure in the phase information of both signals used for the difference formation is removed. This substantially simplifies the subsequent evaluation, since a large part of the otherwise irrelevant information is no longer contained in the differential phase. An example of this is e.g. the intrinsic speed of a vehicle carrying out the method, which is eliminated by the formation of the differential phase. If the intrinsic speed of the vehicle were not eliminated, the method would detect the entire environment of the vehicle as moving in relation to the vehicle, as a result of which a corresponding speed evaluation would have to be calculated for each point or each object in the environment.

It is furthermore preferred that a received reflection signal and/or a transmitted communication signal is split up into a leading and trailing component, wherein the phase of the leading component remains unaffected and the phase of the trailing component is delayed by 90°. A possible ambiguity of the phase information can thus be resolved, since the latter can now be treated as a complex number in the complex number plane rather than as a real number in a one-dimensional number string, and thus has an additional dimension. Similarly, a transmitted communication signal can be split up into a leading and a trailing component for the difference formation with the reflection signal. A similarly simple and effective method for splitting up a signal is to guide the signal via two electrical lines of different lengths, wherein one line is one quarter of the signal wavelength longer than the other line. This causes the described split. Particularly with the occurrence of Doppler frequencies in the reflection signal or in the communication signal, an additional determination of the direction to the object can thus be carried out.

It is appropriately provided that the differential phases are determined by means of mixing of the communication signal with an associated reflection signal or by means of mixing of two different reflection signals, in particular by means of complex conjugate multiplication and/or by means of crossover multiplication. The mixing of two signals produces sidebands with the spacing of the differential frequency along with the two mixed signals, i.e. along with the communication signal and the reflection signal or along with the two reflection signals. Due to the complex conjugate multiplication or crossover multiplication, this step can also be carried out arithmetically in the complex number plane. In all cases, a reliable determination of the differential phases is enabled.

According to a further preferred embodiment of the invention, it is provided that the transceiver transmits communication signals on at least two different frequencies. This creates the possibility for the transceiver to receive corresponding reflection signals which, due to their different frequencies and therefore different characteristics, contain different information on the object reflecting them or differently describe identical information on the object reflecting them. Additional information on the object is therefore available.

In particular, it is preferred that a distance to the object is determined from the phase information generated by the at least two different frequencies. The use of two different frequencies, in particular the use of reflection signals of communication signals transmitted at two different frequencies, enable a determination of the distance to the object using the Vernier method. A distance is inferred from the ratio of the phases which change differently due to the different wavelength or frequency of the transmitted communication signals with the route traveled. Since the ratios of the phases begin to repeat themselves as from a specific distance from the transceiver, a determination of the distance is no longer unambiguous as from a determined distance limit value, since a determined phase ratio may correspond to both a determined distance and any given multiple of this distance. In order to avoid such ambiguities, the transmit power of the communication signals is preferably selected in such a way that a reflection signal from an object which is further away from the transceiver than the unambiguous distance can no longer be sensed.

Furthermore, it is provided in particular that the at least two frequencies are two different communication channels of a common communication means. It is normally thereby ensured that the frequency spacing of the two frequencies is not too great and moreover a uniform evaluation and processing by one and the same communication means is guaranteed.

WLAN according to IEEE 802.11p is quite particularly preferable in this connection as a suitable communication means, wherein communication takes place via two channels in each case having a 10 MHz bandwidth, said channels being separated by a third, unused channel similarly having a 10 MHz bandwidth. Due to the employed wavelength at 5.9 GHz and the employed transmit power, it is ensured with WLAN according to IEEE 802.11p that a frequency-related, maximum unambiguous distance of around 15 m cannot be exceeded for power reasons.

Furthermore, it is preferable for the communication signals and the reflection signals to be received by means of at least two electrically independent antenna elements of the transceiver, wherein, in particular, the phase information is determined by means of the at least two antenna elements. This offers the advantage that the interferometer method can be used, which enables a determination of the direction to the object. In this case, one and the same reflection signal is preferably evaluated in terms of its phase information on the two antenna elements. It must be noted here that the spatial distance between the antenna elements must not be greater than half the wavelength of the transmitted communication signals or the received reflection signals, as ambiguities in the direction information will otherwise occur. Since the reflection signal runs from the object back to the transceiver, which receives the reflection signal with two spatially separated antenna elements, the object is normally detected by the two antenna elements at a slightly different angle. This different angle is also responsible for the fact that the distance traveled by the reflection signal from the object to the two antenna elements is not exactly identical. This in turn results in different phase information of the reflection signal in each case on each of the two antenna elements. Moreover, since the spatial distance between the antenna elements is known, an angle can be determined from the phase information which indicates the direction of the object reflecting the reflection signal to the receiver. If two electrically independent antenna elements are used, the direction to the object can be unambiguously determined to 180°. In this case, reflection signals and communication signals at the same frequency are preferably used, so that the different phases are not generated by different frequencies.

It is particularly preferable for the communication signals and the reflection signals to be received by means of four electrically independent antenna elements of the transceiver, wherein, in particular, the phase information is determined by means of the four antenna elements. This allows the direction of the object to the transceiver to be unambiguously determined to 360°. For example, the phase information on a first pair of antenna elements can be regarded as the sine component and the phase information on the second pair of antenna elements as the cosine component of a total signal. Through application of an $\arctan^2$ function to the sine component and the cosine component, an angle is obtained which unambiguously describes the direction to the object to 360°.

Furthermore, it is particularly preferable for a direction to the object to be determined from the phase information generated by the at least two antenna elements. The direction to the object is thus determined by means of the interferometer method already described.

Furthermore, it is advantageous that the direction and the distance to the object are determined by means of temporally alternating evaluation of the differential phases of two frequencies and the differential phases on two antenna elements. This offers the advantage that, as well as the distance, the direction to the object can also be unambiguously determined to 360° through the comparatively simple setup with only two antenna elements by means of the method according to the invention.

It is furthermore preferable for the transceiver to communicate with communication participants, in particular with road users, and with infrastructure devices. This offers the advantage that the transceiver also exchanges information with its environment in the form of communication signals. This favors a frequent transmission of communication signals by the transceiver and therefore also favors the method according to the invention. The infrastructure devices may, for example, be traffic signs, traffic lights or other transmitting devices which serve to control road traffic. The traffic participants are, for example, motor vehicles, but also cyclists or correspondingly equipped pedestrians.

It is furthermore provided that the objects are traffic participants, in particular vehicles, cyclists and pedestrians, infrastructure devices and communication participants.

This also enables an exchange of position data of the communication participants, which in this case represent objects, by means of the communication signals, wherein the position data can be validated by means of the method according to the invention.

It is appropriately provided that the transceiver in each case determines a Doppler frequency for the at least one object in the signal propagation zone. The Doppler frequency contains additional information on the speed of the object. Thus, along with the distance and the direction to the object, a speed of the object can also be determined with which the object and, in particular, a behavior of the object are more precisely described.

In particular, it is appropriate for the Doppler frequency to be determined from a Doppler phase, wherein the Doppler frequency is determined in particular by means of linear extrapolation from a temporally first determination of the Doppler phase and a temporally second determination of the Doppler phase. Since the transmitted communication signals are normally temporally too short to pass through at least two zero points during the transmission, and therefore the reflection signals are correspondingly also temporally too short to pass through at least two zero points during the reception, this thus offers the advantage that the Doppler frequency can nevertheless be determined from the Doppler phase. The Doppler phase can initially be determined comparatively simply from the differential phase between the transmitted communication signal and the received reflection signal. The Doppler phase is determined, in a temporally first determination of the Doppler phase, in each case at the start of a received reflection signal and, in a temporally second determination of the Doppler phase, in each case at the end of a received reflection signal. The Doppler frequency can then be determined in a simple manner from the Doppler phase by means of linear extrapolation.

According to a further preferred embodiment of the invention, it is provided that the Doppler frequency is filtered by means of a low-pass filter, in particular by means of a digital low-pass filter. This has the effect that, depending on the design of the low-pass filter, Doppler frequencies which exceed a determined limit frequency are filtered and not used for the further evaluation. According to a particularly preferred embodiment, the low-pass filter is designed in such a way that Doppler frequencies generated by differential speeds of more than 400 km/h are filtered.

In particular, the digital low-pass filtering is followed by a subsampling, known per se, of the received signals. The amount of calculation required for the respective subsequent fast Fourier transform is thereby substantially reduced. Only simple fast Fourier transforms are preferably calculated, since low Doppler frequencies are expected (due to differential speeds normally lower than 400 km/h). The calculation with low Doppler frequencies of this type also results in correspondingly reduced latency times. This is advantageous in the case of a traffic localization, since up-to-date data on target objects are always required. The latency times tolerable in this connection are preferably shorter than 250 ms.

It is furthermore provided that a movement path of the at least one object is produced from a multiplicity of determined distances and directions. This offers the advantage that an object tracking is enabled which can in turn be subjected to a series of filter methods known per se, e.g. a Kalman filter. Objects having an implausible movement path can therefore be rejected as non-existent.

It is furthermore advantageous for a determined position of a communication participant to be aligned with a position datum contained in a message sent by the communication participant and the position datum is validated if it does not conflict with the determined position. The invention thus enables positions which are contained in communication signals of different traffic participants to be validated in a simple manner. Appropriate tolerances must in each case be adhered to for the validation of the position. Furthermore, the position contained in the communication signals as the absolute position, which is often based on the GPS coordinate system, must normally be converted into a position relative to the transceiver or vice versa.

It is furthermore appropriate for data transported in the received communication signals to be proportionally evaluated. This offers the advantage that a communication process normally taking place can continue to be carried out unaffectedly and unrestrictedly. The method according to the invention thus results in no restriction whatsoever of the communication capability of the receiver.

It is furthermore preferable for the transported data and/or the determined positions to be forwarded to at least one driver assistance system. Both the transported data and the determined positions can thus be processed, where appropriate also jointly, by a corresponding driver assistance system and can be used for driver support. This enables a safety-increasing use of existing information and data. A distance and speed controller can also be implemented in a simple manner by means of the method according to the invention, since both the distance to a vehicle in front and the speed of the vehicle in front can be determined. The comparatively high equipment costs for the radar sensor normally used in this case can thus be eliminated.

According to a further preferred embodiment of the invention, it is provided that the transceiver transmits communication signals without information content and/or transmits communication signals of which the information content remains valid in multiple succession. This is advantageous whenever a sufficient quantity of communication signals for position determination is not transmitted for communication reasons. So that the method according to the invention can be carried out reliably in this case also, either communication signals without information content or communication signals of which the information content remains valid are transmitted. The communication signals without information content are preferably marked as such, so that a possible recipient of these communication signals is informed that the communication signals deliberately contain no information.

It is furthermore advantageous that a receive power of the reflection signal is evaluated. Since the transmit power per area unit weakens by the square of the traveled distance of the communication signal and the reflection signal behaves similarly, the transceiver can also infer the distance to the object via the received power by means of the aforementioned relation. This represents additional information which further describes the object.

In particular, it is advantageous that a class of the at least one object is determined from the distance and the receive power. Since the distance can be determined as described both according to the Vernier method and via the receive power dropping by the fourth power over the distance, a class of the object can be determined from the ratio of these two variables. The receive power on the transceiver is influenced by the reflectivity of the object in relation to the communication signal. For example, the reflectivity for a motor vehicle is around 0.8, whereas it is only around 0.1 for a pedestrian. The reflectivity of the object can thus be determined from the ratio of the aforementioned variables and the class of the object can be determined via the reflectivity.

It is furthermore preferable for the distance and/or the direction to the object to be determined from a ratio formed from an electromagnetic field strength received by the at least two antenna elements. This offers the advantage that further information is again available which describes the object and can be used to validate the distance or direction determined from the phase information. Alternatively, the distance or direction determined from the ratio of the received electromagnetic field strength can also be used to form a mean value with the information determined from the phase information or to weight said information. This method step is particularly advantageous if the antenna elements have a directional characteristic.

The invention furthermore relates to a device for the communication-signal-based position determination of objects which include a transceiver with a transmit module for the wireless transmission of communication signals and with a receive module for the wireless reception of communication signals and reflection signals, wherein the reflection signals are at least partially reflected on objects in a propagation zone of the communication signals, wherein the transceiver is capable of simultaneous transmission and reception, and wherein the transceiver furthermore includes an antenna arrangement. The device is characterized in that the device determines phase information of the reflection signals and/or the communication signals by means of phase evaluation means and carries out in particular the method according to the invention. Since the device according to the invention thus includes all means necessary to carry out the method according to the invention and carries out in particular the method according to the invention, the aforementioned advantages result herefrom.

The device is advantageously designed as an extended vehicle-to-X communication device.

It is preferably provided that the device determines a distance from the phase information by means of distance determination means and/or determines a direction to the at least one object by means of direction determination means. The device thus fulfils an additional function extending beyond the pure communication function, which immediately creates a tangible added value for the driver of a vehicle equipped with the device according to the invention, regardless of whether a sufficient number of surrounding vehicles capable of vehicle-to-X communication is present in his environment.

It is preferably provided that the antenna arrangement has a directional characteristic in order to determine an incoming direction of the communication signals and/or the reflection signals. This offers the advantage that a comparatively precise, additional determination of the direction to the object is enabled via the directional characteristic. This information obtained from the receive power can supplement the information obtained from the phase information.

It is furthermore preferable for the antenna arrangement to consist of at least two antenna elements. On the one hand, this enables the performance of the interferometer method already described for determining the direction of the objects and, on the other hand, helps to increase the effect of the directional characteristic.

It is appropriately provided that the antenna elements are assignable via switching elements to the transmit module and/or to the receive module and/or to a terminal resistor, and that the directional characteristic is defined by the assignment. This offers the advantage that the antenna elements are, for example, assignable to the transmit module in such a way that they transmit in selected spatial directions. Or the antenna elements are assigned to the receive module in such a way that a directional characteristic is produced for a determined direction.

A multiplicity of different assignments can be stored in the form of an assignment table in an electronic memory and can be selected according to one or two of the following schemes:

the assignment table is run through cyclically with a fixed frequency,
the assignment table is run through randomly by means of a pseudonoise method,
the assignment table is run through randomly,
the assignment is adapted according to the type of the applications based on the method according to the invention,
the assignment is adapted to a current situation,
the assignment is adapted to signals from other environment sensors,
the assignment is adapted to the received communication signals,
the assignment is adapted to a detected danger situation, and/or
the assignment is adapted to an uncertainty of an evaluation of an environment sensor and in particular a radar sensor.

If the assignment table is run through randomly by means of a pseudonoise method, systematic errors can be reduced. In the random run-through of the assignment table, e.g. the area in front of the vehicle can be given a higher weighting than the area to the left and right of the vehicle and these in turn can be given a higher weighting than the area behind the vehicle, at least if the focus of the respective applications is on the area in front of the vehicle and next to the vehicle. The assignment to a current situation, e.g. in the case of a fast journey on an expressway, allows an assignment preferably to be selected which effectively receives communication signals from in front and from behind or can effectively transmit in these directions. In the case of a braking maneuver, the rear area is preferably selected. At an intersection, the area to the left in front of the vehicle and to the right in front of the vehicle is preferably selected. In the case of an assignment adapted to signals from different environment sensors, it is detected e.g. by an environment sensor that an object is approaching from the left, so that the area to the left of the vehicle is preferably selected. If the assignment is adapted to the received communication signals, it is possible e.g. to proceed so that the direction from which the most communication signals are received is preferably selected—or deliberately the opposite. In the case of an assignment adapted to a danger situation, the assignment is selected in such a way that the best reception is in the area where the greatest danger has been detected. In the case of an assignment which is adapted to the uncertainty of the radar evaluation, the highest receive sensitivity is selected for the direction which has the greatest evaluation uncertainty of the received radar signals.

Since the transmit power per space segment is also reduced by this procedure, the communication signals can be transmitted more frequently or in a more targeted manner. This corresponds to a physical geocasting.

It is furthermore provided that the antenna elements are arranged into a multi-beam star and/or a polygon, in particular a rectangle, and/or are shaped as Vivaldi horns and/or surround a metal tube reflector radially and/or are shaped as narrowband patch elements and/or are aligned in a back-toback arrangement. Such shapes and arrangements have proven to be advantageous in various respects and in various situations.

In particular, it is provided that the antenna arrangement additionally includes an antenna element of a global navigation satellite system. The antenna element of the global navigation satellite system is preferably arranged in such a way that it has its best receive characteristics for signals arriving from above. Such an antenna element of the global navigation satellite system, preferably pointing upwards, can be arranged in a space-saving and effective manner in particular in an intermediate space between the other antenna elements.

The present invention furthermore relates to the use of the device according to the invention in a motor vehicle.

BRIEF DESCRIPTION OF THE DRAWINGS

Further preferred embodiments can be found in the following description of an example embodiment with reference to figures.

In the figures:

FIG. 16 shows a further possible embodiment of an antenna arrangement according to the invention, FIG. 17 shows two assignment tables for defining a directional characteristic.

FURTHER DESCRIPTION OF THE INVENTION

Figure 1:
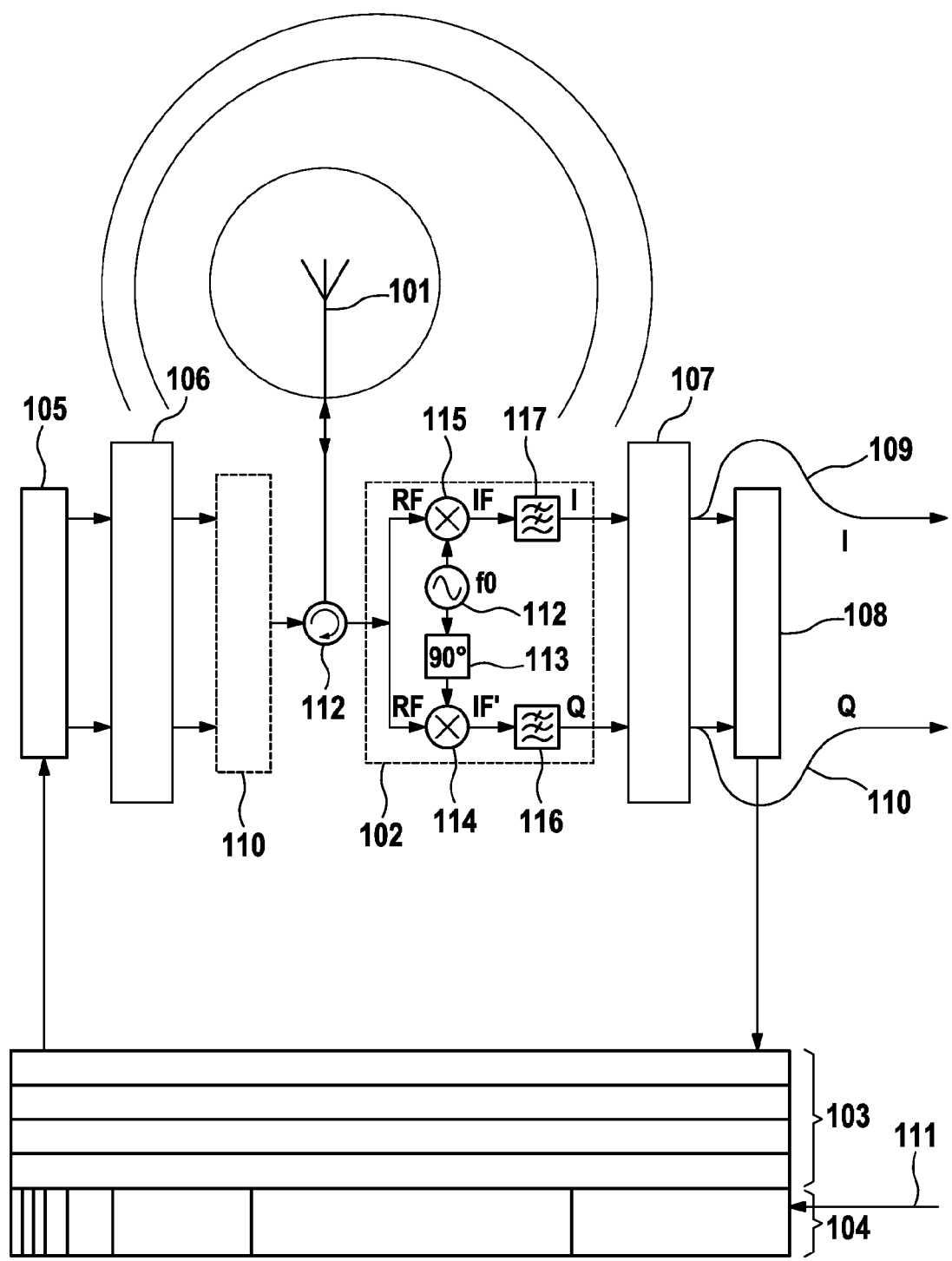
FIG. 1 shows an example of a first diagram of a device according to the invention for communication-signal-based position determination of objects.

FIG. 1 shows an example of a first diagram of a device according to the invention for the communication-signal-based position determination of objects. The device includes a transmit module 100, an antenna element 101, a receive module 102, a modulator 105 for generating a communication signal to be transmitted in digital form, a digital-analogue converter 106 for converting the digital signal into an analogue signal, an analogue-digital converter 107 for converting a received communication signal or reflection signal into digital form and a demodulator 108 for demodulating the received communication signal or reflection signal in order to be able to further process said signal. By means of a circulator 112, the antenna 101 can be used for the simultaneous transmission and reception of communication signals and reflection signals. Since the device may include only one single antenna element, it can in principle carry out only the Vernier method for determining the distance and additionally a determination of the Doppler frequency. The device transmits in each case temporally alternately on a first and a third WLAN channel of the WLAN method according to 802.11p, while a second channel separating the first channel from the third channel remains unused. Via a communication block 103, an information connection of different driver assistance systems 104 is guaranteed by means of the modulator 105 or demodulator 106. Driver assistance systems 104 can thus initiate the transmission of communication signals and can process communication signals. The receive module 102 includes, for example, a clock generator 112 which specifies a clock frequency of 5.9 GHz which corresponds to the basic frequency of the WLAN 802.11p used by the device for communication. An identical clock generator is also provided in the transmit module 100, but this is not shown in FIG. 1 for the sake of clarity. Furthermore, the receive module 102 includes a delay element 113, which, via an adapted line length, delays the clock signal output by the clock generator 112 on the signal path to the mixer 114, similarly provided by the receive module 102, in comparison with the mixer 115 by 90°. This effects a split of the received communication signal or reflection signal into a leading component I and a trailing component Q. The mixers 114 and 115 mix the components I and Q with the clock signal from the clock generator 112. Low-pass filters 116 and 117, which filter the high-frequency components of the received reflection signals, in each case follow the mixers 114 and 115. Via shunts 109 and 110, both the leading component I and the trailing component Q are output following the digitization onto the second cutout of the device according to the invention shown in FIG. 2 for the communication-signal-based position determination of objects. A frequency changeover or the transmission of a communication packet without information content can furthermore be initiated according to a requirement received via the data line 111.

Figure 2:
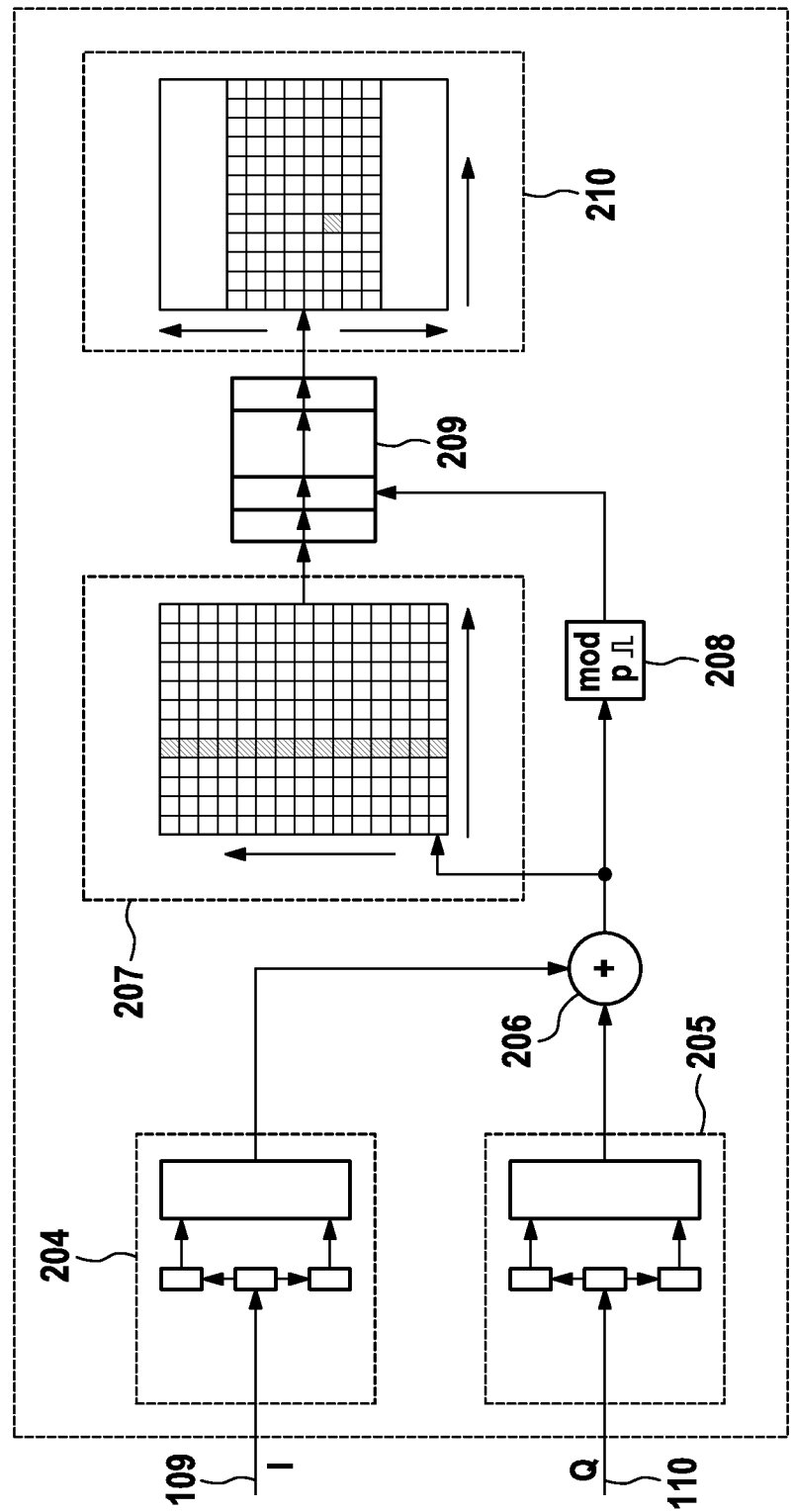
FIG. 2 shows an example of a second diagram of a device according to the invention for communication-signal-based position determination of objects.

FIG. 2 shows an example of a second diagram of a device according to the invention for the communication-signal-based position determination of objects. Both the component I and the component Q are subjected to a preprocessing in correlation modules 204 and 205. The component I represents the real component of a complex number, whereas the component Q represents the imaginary component of the complex number. An adder 206 then combines the two components to form the complex number. The complex number is then fed, on the one hand, to a Vernier module 207, where it is represented as a real-time function over time and, on the other hand, is forwarded to a Doppler frequency module 208, which prepares the complex number for processing in a filter module 209. A low-pass filtering, downsampling, fast Fourier transform and determination of the complex number amount are carried out by means of the filter module 209. These data are then forwarded in turn to a speed module 210 which, along with the distance, now also represents the speed of an object on a two-dimensional map.

Figure 3A:
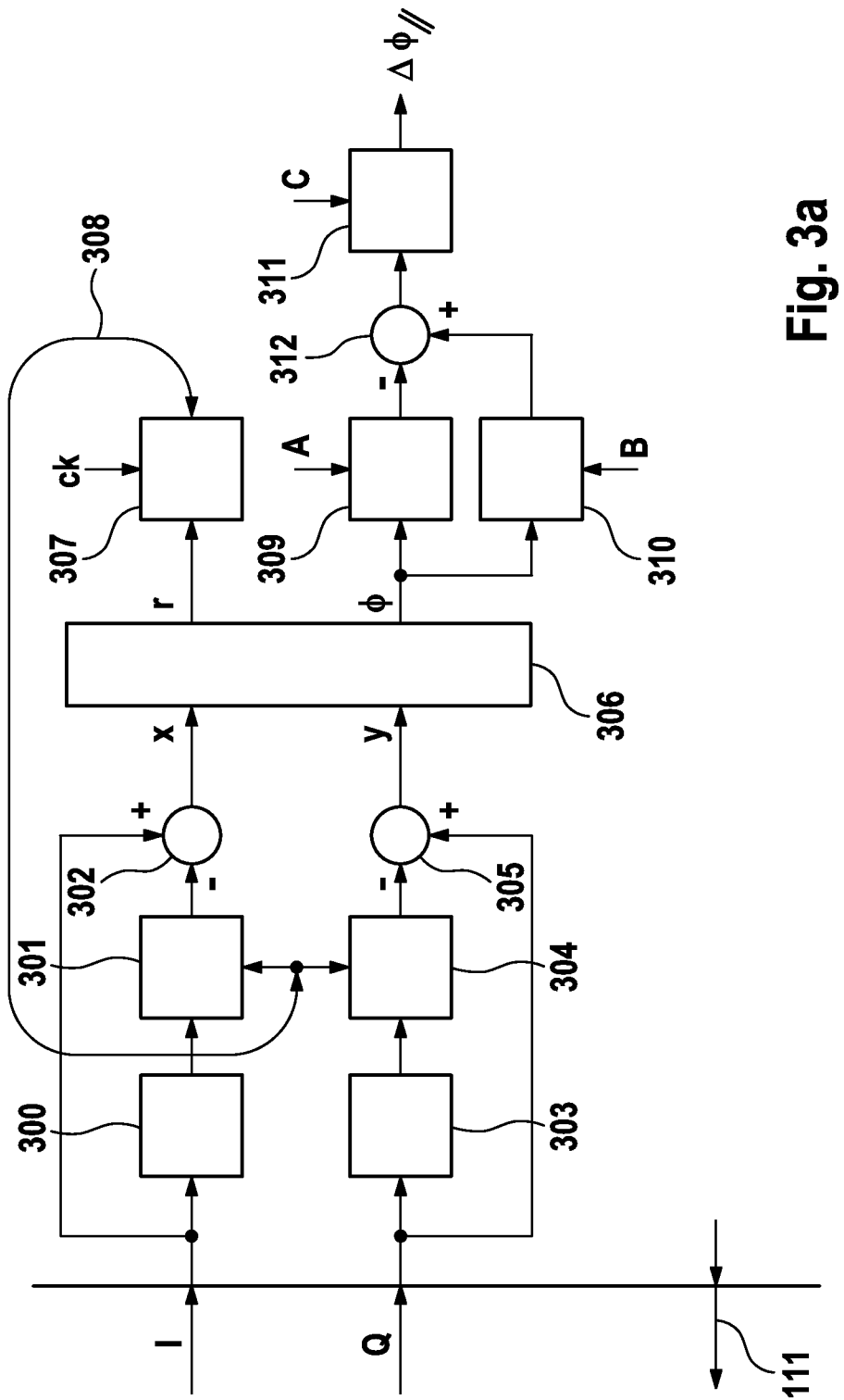
FIG. 3 shows a schematic structure of a device according to the invention which is suitable for determining the direction to the object.
Figure 3B:
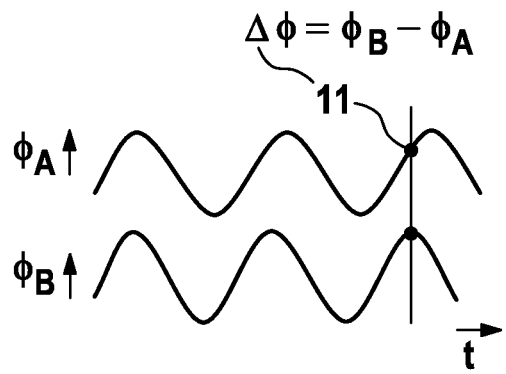
Figure 3C:
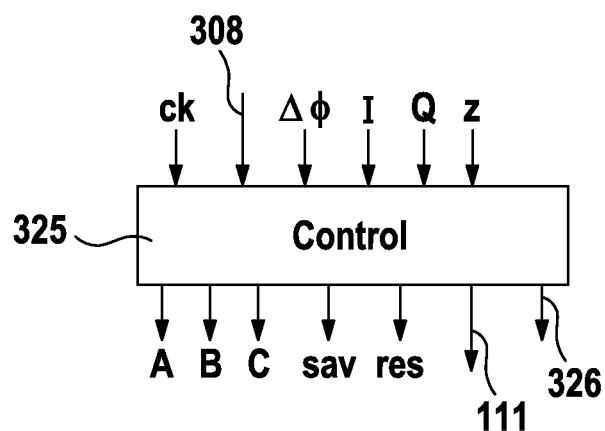

FIG. 3a shows a schematic structure of a device according to the invention for the communication-signal-based position determination of objects which is suitable for determining the direction to the object via the interferometer method. The component I of a reflection signal at the output of the analogue-digital converter 107 is forwarded by means of the shunt 109 (FIG. 1) and first passes through a low-pass filter 300. The component I is then stored by means of a sample-and-hold element 301 and the zero point of the I component is determined. The zero point of the component I is then aligned with the zero points averaged by the sample-and-hold element 301 by means of a subtracter 302. Deviations in the reflection signal or in the component I which interfere with the following evaluation can thus be eliminated. The component Q is processed accordingly by means of a low-pass filter 303, a sample-and-hold element 304 and a subtracter 305. The components I and Q processed in this way are forwarded as input variables x and y to an arctan calculator 306, whereupon the radius r and phase $\Phi$ of the complex number formed by the components I and Q are present. The radius r is used by a plausibility verification module 307 which checks in the clock ck whether a reflection signal or a communication signal is present. If no reflection signal but rather a communication signal is detected here, a predefined zero point can be set directly by means of a reset command via a feedback 308. In the extreme case, an implausible reflection signal may, on the other hand, be detected. Even then, a predefined zero point is set and the reflection signal is classified in this case as implausible. The phase $\Phi$ may correspond either for frequency A to the phase $\Phi_A$ or, in the case of frequency B, to the phase $\Phi_B$. If the Vernier principle is applied, the required distance information lies in the differential phase $\Delta\Phi$ (see FIG. 3b), which is formed by means of the sample-and-hold elements 309, 310, 311 and the subtracter 312, using control signals A, B and C (FIG. 3a, 3c). The control signals A and B simultaneously control the frequency changeover in the communication system. The signal C is output in each case if the valid differential phase $\Delta\Phi$ can be transferred.

Figure 3E:
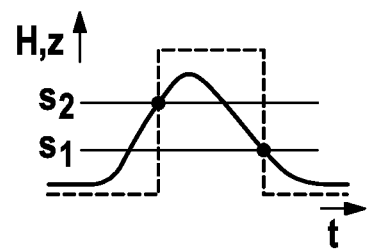
Figure 3D:
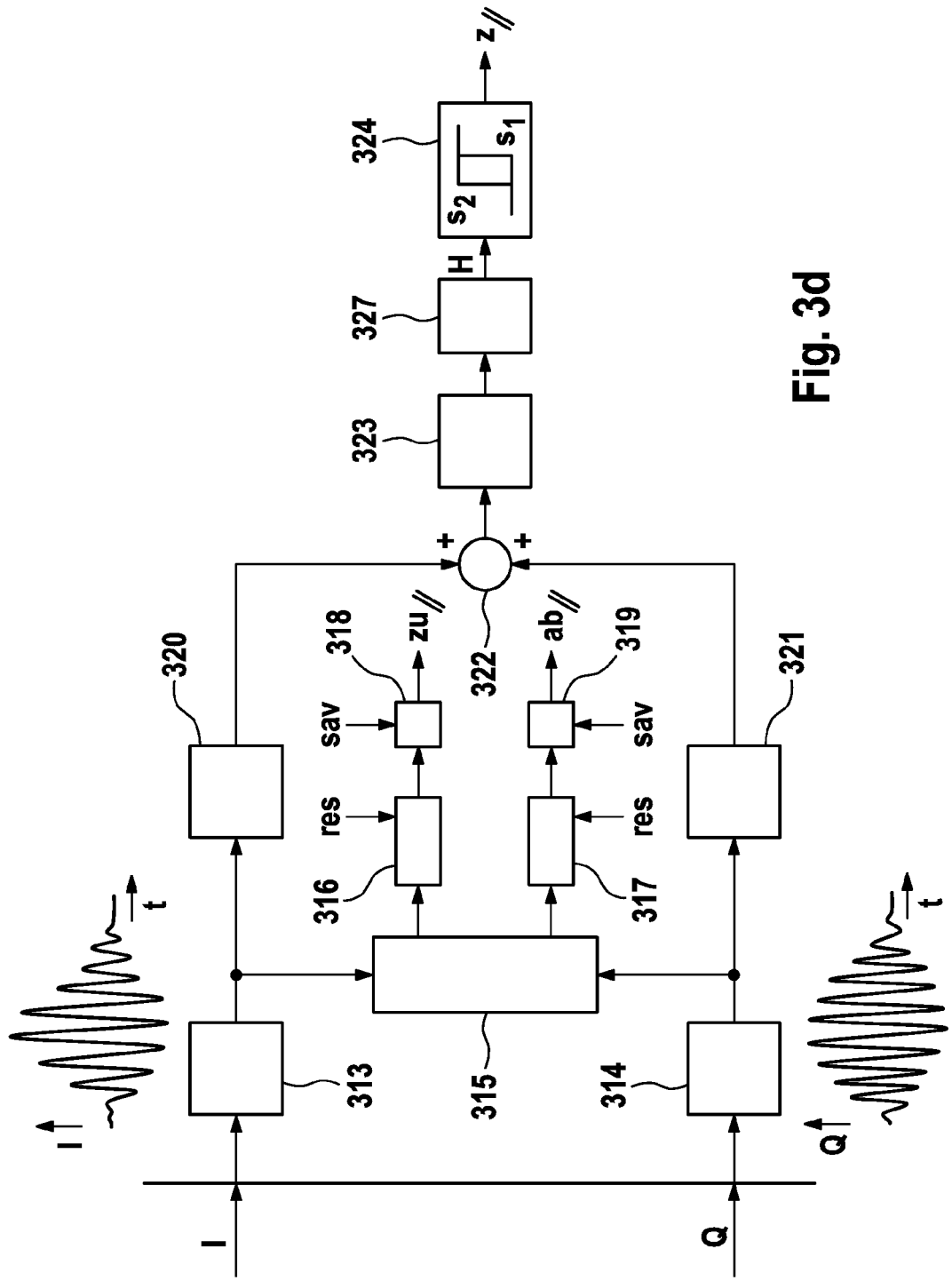

Simultaneously with the previously described method sequence in FIG. 3a, the components I and Q are forwarded in FIG. 3d via band-pass filters 313 and 314 for an assumed minimum speed of the object to be detected to a direction detection module 315 which is formed, by way of example, by two flip-flops. Counters 316 and 317 which count incoming and outgoing half-waves of the components I and Q depending on the direction of rotation of the phase are disposed at the output of the direction detection module 315. The counters 316 and 317 separated into incoming and outgoing half-waves of the components I and Q can be reset by means of the signal res and stored in a storage module 318 or 319 by means of the signal say.

In a further evaluation, the filtered components I and Q are forwarded to a squarer 320 and 321, a summator 322 and a root function 323, in combination therefore a Pythagoras element, and to a low-pass filter 327, at the output of which the envelope H (see also FIG. 3e) is formed. The signal z, which indicates the fundamental presence of a moving object in the signal propagation zone, is formed by means of a dual-flank discriminator 324.

The evaluation means are evaluated and operated in summary by the processor 325 (FIG. 3c) which can, if required, also initiate the transmission of additional communication signals without information content via the communication unit and can initiate a frequency changeover. The output of a warning to the driver is also possible, if required, via the output 326.

Figure 4A:
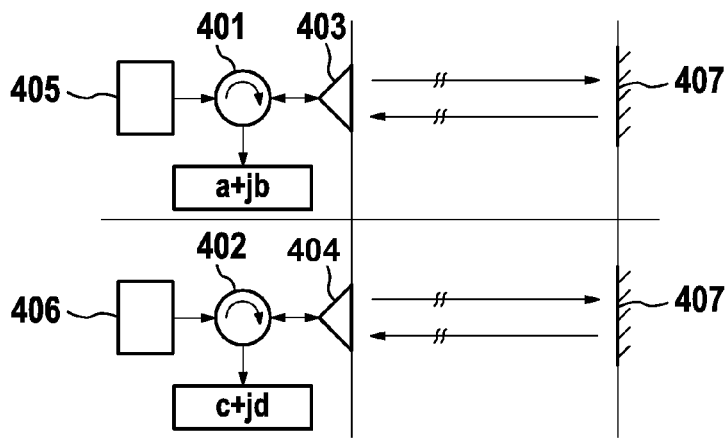
FIG. 4 shows schematically the basic principle of the Vernier method for distance determination.
Figure 4B:
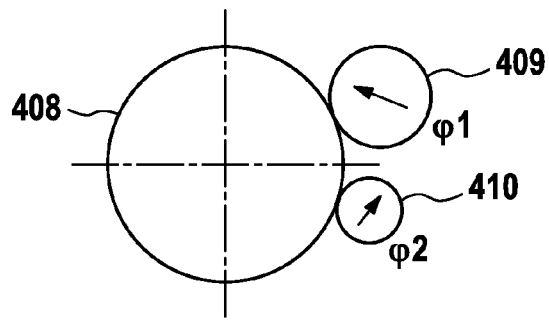

FIG. 4a shows schematically a transceiver transmitting and receiving via an antenna arrangement with two antenna elements 403 and 404. By means of circulators 401 and 402, the transceiver is able to receive and transmit in each case simultaneously via both antenna elements 403 and 404. Clock generators 405 and 406 specify an in each case slightly different transmit frequency f1 and f2 for each antenna element 403 and 404. The transmitted communication signals arrive at the object 407 in the signal propagation zone and are reflected by said object. The routes traveled from the antenna elements 403 and 404 from the transceiver to the object 407 and back can be assumed to be identical, since the antenna elements 403 and 404 are arranged spatially very close to one another. Due to the different transmit frequencies f1 and f2, the reflection signals arrive with different phases at the antenna elements 403 and 404. The distance to the object can then be determined from this differential phase. This is clearly shown in FIG. 4b. FIG. 4b shows a large cogwheel 408, which symbolizes the distance to the object, a medium-sized cogwheel 409, which symbolizes the phase $\Phi_1$ of the reflection signal transmitted at the transmit frequency f1 during the reception on the antenna elements 403 and 404, and a small cogwheel 410, which symbolizes the phase $\Phi_2$ of the reflection signal transmitted at the transmit frequency f2 during the reception on the antenna elements 403 and 404. It now becomes vividly clear that a determined distance of the object corresponds to a determined combination of phases $\Phi_1$ and $\Phi_2$ and also a difference of phases $\Phi_1$ and $\Phi_2$.

Figure 5:
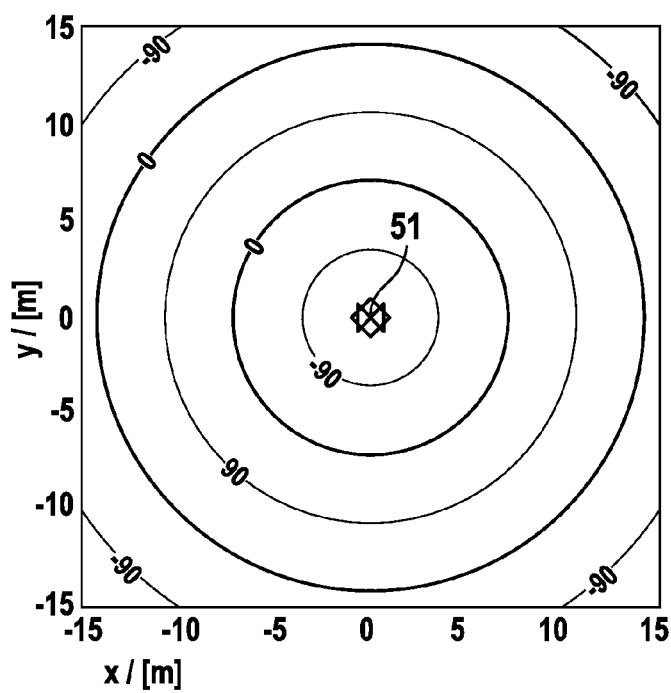
FIG. 5 shows a two-dimensional phase diagram which assigns a distance in each case to the possible differential phases.

FIG. 5 shows a two-dimensional phase diagram which in each case assigns a distance to the possible P differential phases of $-180°$ to $+180°$. The location of the transceiver 51 is drawn in the center. Since it is impossible for the transceiver 51 to distinguish whether the differential phase is actually between $-180°$ and $+180°$ or whether an integral multiple of the identified differential phase is involved, the method is no longer unambiguous for distances as from a frequency-dependent limit value, since a plurality of distances may correspond to one identified differential phase (see also FIG. 4b).

Figure 6:
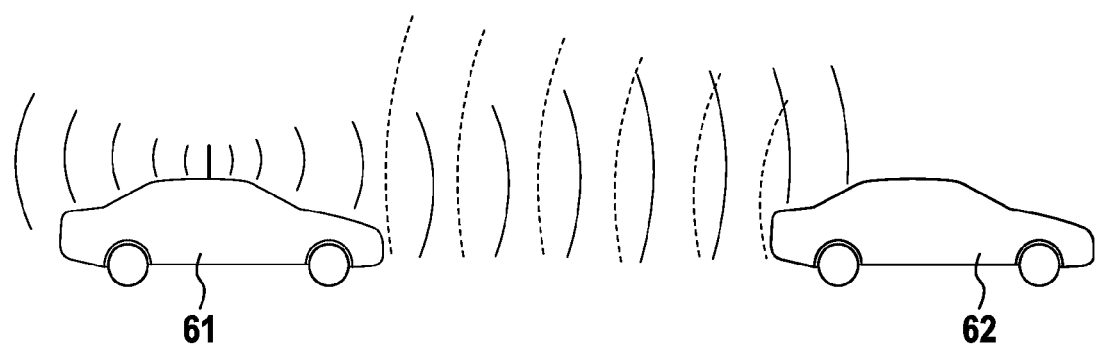
FIG. 6 shows two vehicles, wherein one of the vehicles is equipped with the device according to the invention.

FIG. 6a shows two vehicles 61 and 62, wherein the vehicle 61 is equipped with the device according to the invention and carries out the method according to the invention. The device according to the invention comprises a transceiver which communicates by means of WLAN according to 802.11p. Communication signals which are transmitted by means of WLAN according to 802.11p can normally be received by a further transceiver at a distance of up to 300 m. The reason for the limited range is that the further the communication signal is away from the transceiver, the lower the power of the communication signal per area unit. The power per area unit decreases by the square of the distance traveled. On the vehicle 62, the proportion of the communication signal which arrives at the vehicle 62 is reflected back proportionally as a reflection signal in the direction of the vehicle 61. The proportion which is reflected back by the vehicle 62 depends on the geometry of the vehicle 62 and the surface materials of the vehicle 62. In this case, 80% of the power arriving at the vehicle 62 is reflected back. Since the power per area unit of the reflection signal also decreases by the square of the distance covered, the vehicle 61 receives only a power which corresponds to the originally transmitted power divided by the fourth power of the distance to the vehicle 62, additionally weakened by 20%, since the vehicle 62 reflects only 80% of the arriving power. Since the transmission range of WLAN according to 802.11p is around 300 m and the vehicle 61 must still be able to receive and evaluate the reflection signal, a power-related maximum establishable distance of around 15 m for the vehicle 62 from the vehicle 61 is obtained according to the above relations.

Figure 7:
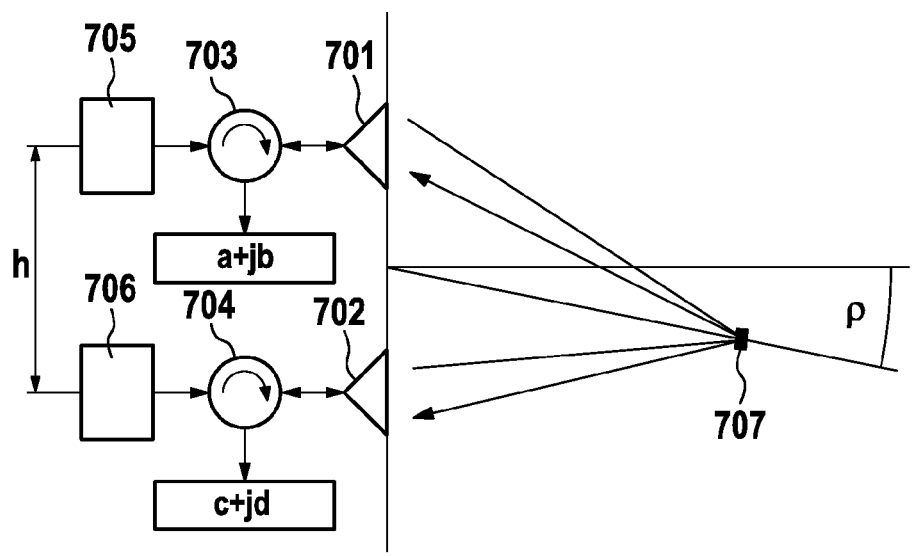
FIG. 7 shows a transceiver of a device according to the invention which establishes a direction to an object by means of the interferometer method.

FIG. 7 shows a transceiver of a device according to the invention which establishes a distance to an object by means of the interferometer method. The device has an antenna arrangement having two antenna elements 701 and 702. By means of circulators 703 and 704, the transceiver is able to receive and transmit in each case simultaneously via both antenna elements 701 and 702. The clock generators 705 and 706 specify a transmit frequency f1 in each case identical for each antenna element 701 and 702. The antenna elements 701 and 702 are separated from one another by a spatial distance h, wherein h corresponds to just below half the wavelength of the transmitted communication signals. The transmitted communication signals arrive at the object 707 in the signal propagation zone and are reflected by said object. The route traveled from the antenna elements 701 and 702 from the transceiver to the object 707 and back is in this case slightly different due to the spatial distance h. Since the reflection signal generated by the object 707 is thus sensed with different phases by the antenna elements 701 and 702, the angle ρ can be determined from the differential phases, said angle indicating the direction from the transceiver to the object. However, the method shown with reference to FIG. 7 is unambiguous to 180° only, since the object 707 could also be located at the angle ρ on the left-hand side of the transceiver (instead of, as shown here, on the right-hand side) and the same differential phase would occur here on the antenna elements 701 and 702.

Figure 8A:
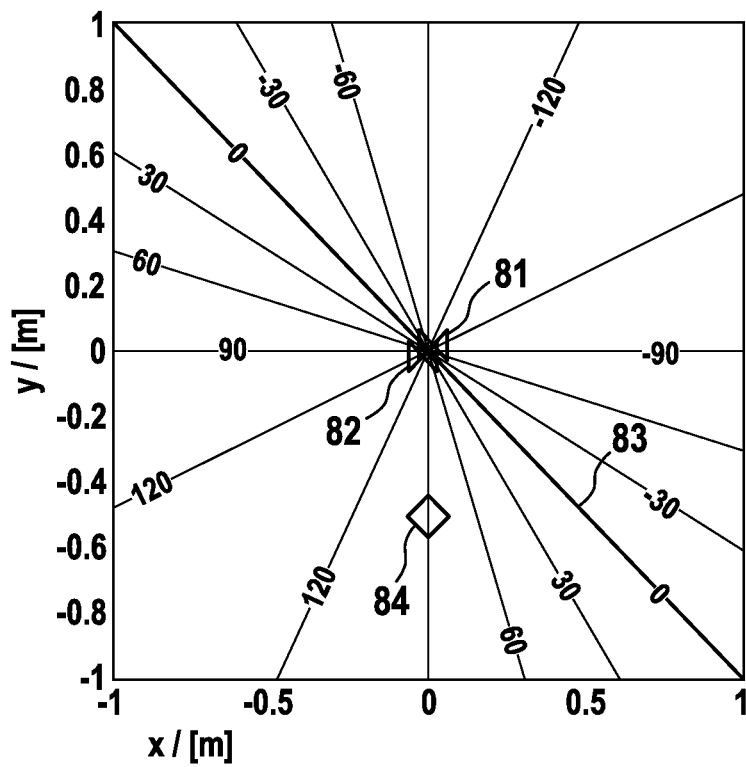
FIG. 8 shows schematically a determination of a direction according to the interferometer method.
Figure 8B:
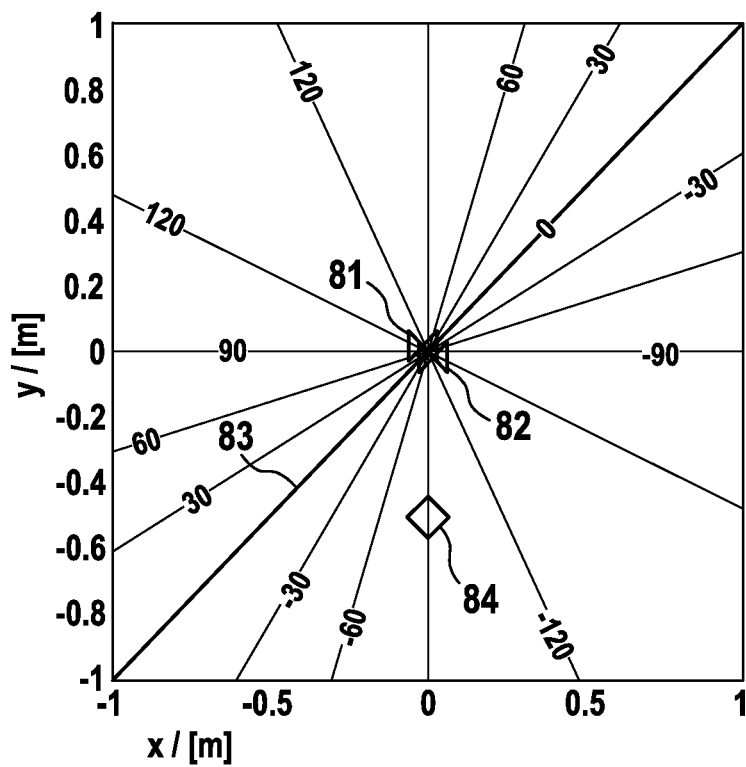

FIG. 8 shows schematically the phase-dependent determinations of a direction according to the interferometer method already described. FIG. 8a shows two antenna elements 81 and 82 which are arranged with a slight spatial offset. Due to the selected alignment or spacing of the antenna elements 81 and 82, the baseline 83 corresponds to a differential phase of 0°, i.e. a reflection signal which emanates from an object at any given point on the baselines would be sensed with a differential phase of 0°. Furthermore, an object 84 is shown which is located in the drawing of FIG. 8a below the antenna elements 81 and 82 with a differential phase of 90°. It is similarly evident in this connection that it is not unambiguously establishable by means of the antenna elements 81 and 82 whether the object 84 is located below or above the antenna elements 81 and 82, since both positions result in the sensed differential phase of 90°.

FIG. 8b again shows the antenna elements 81 and 82, but this time rotated through 90° to the left. According to the alignment and arrangement of the antenna elements 81 and 82, the alignment of the baseline 83 characterized with 0° also changes. The object 84 nevertheless appears again with a differential phase of 90°.

Figure 8C:
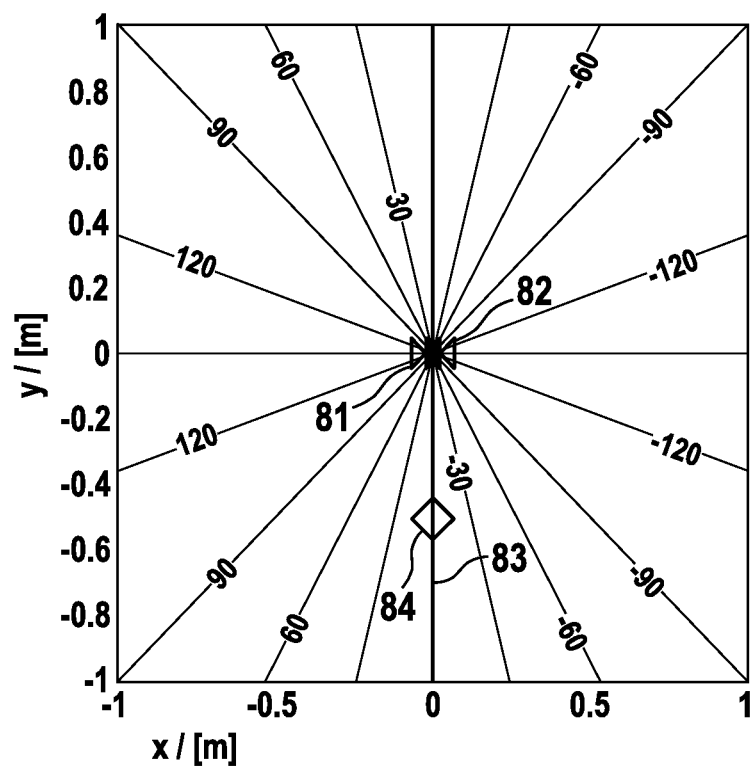

FIG. 8c also shows the antenna elements 81 and 82, wherein the latter are aligned here in such a way that the baseline 83 characterized with 0° runs vertically from the top down. The object 84 is sensed accordingly with a differential phase of 0° on the baseline.

Figure 9:
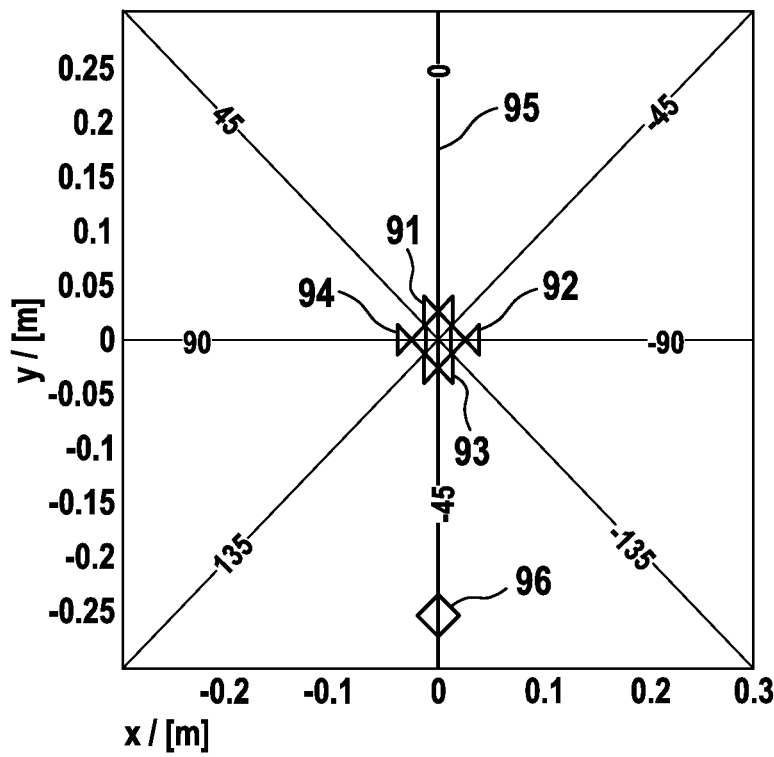
FIG. 9 shows an antenna arrangement having four antenna elements.

FIG. 9 shows an antenna arrangement which includes four antenna elements 91, 92, 93 and 94 which are arranged in the shape of a cross and have a spatial distance from one another which is less than half the wavelength of the transmitted communication signals. Through the use of the four antenna elements 91, 92, 93 and 94, the ambiguity of the direction in the interferometer method shown in FIG. 8 is eliminated, so that the object 96 is unambiguously identified as being located below the antenna arrangement and on the baseline 95.

Figure 10:
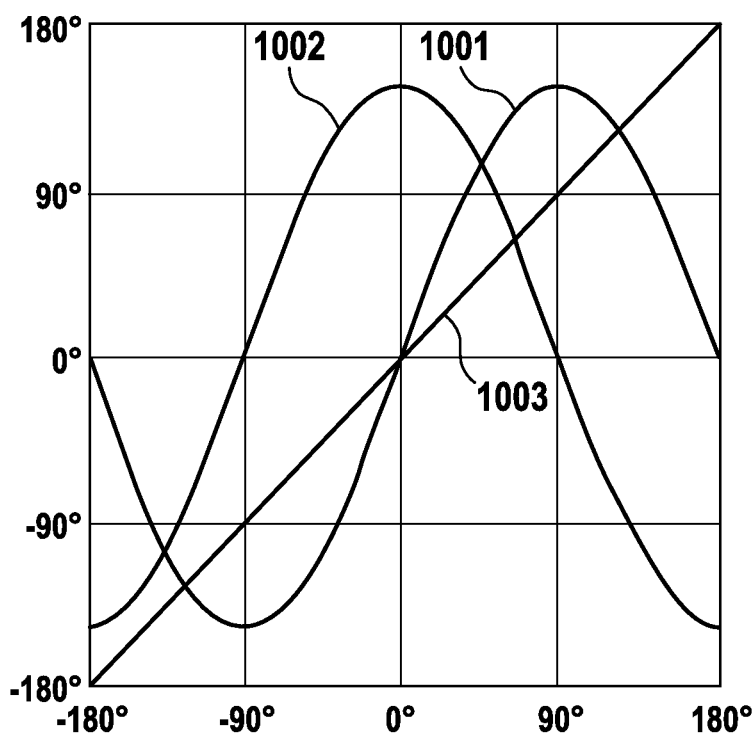
FIG. 10 shows a possible evaluation of the reflection signals sensed by four antenna elements for determining a, FIG. 11 shows a further possible structure of an antenna arrangement having four antenna elements.

FIG. 10 shows a possible interpretation and evaluation of the reflection signals sensed by the four antenna elements 91, 92, 93 and 94 (FIG. 9) for determining the direction according to the interferometer method. The differential phase is interpreted on a first pair of antenna elements as the sine component 1001 and the differential phase on the second pair of antenna elements as the cosine component 1002. Through application of an arctan$^2$ function to the sine component 1001 and cosine component 1002, the straight line 1003 is obtained which enables a determination, unambiguous to 360°, of the direction to the object.

Figure 11:
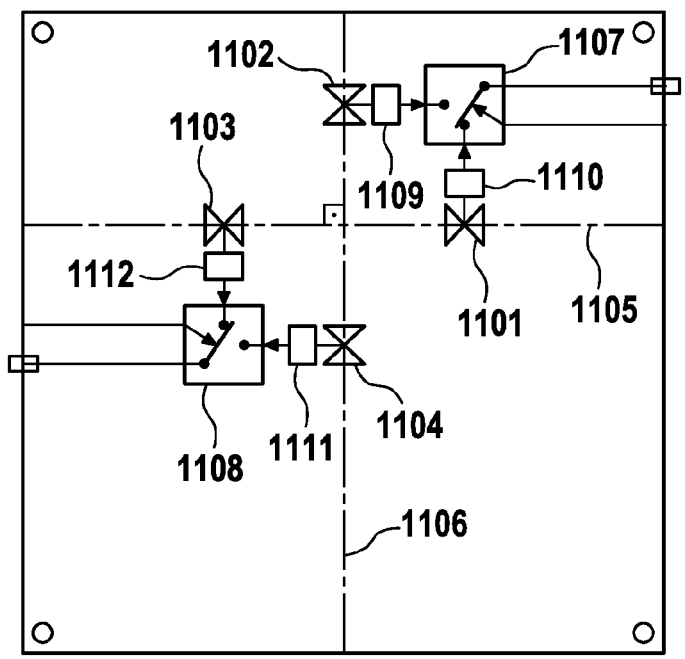

FIG. 11 shows a possible structure of an antenna arrangement which includes four antenna elements 1101, 1102, 1103 and 1104 and is suitable for the interferometer method. Through the selection of four antenna elements, a separate baseline 1105 and 1106 is initially produced for each pair of antenna elements. The distance between the antenna elements 1101, 1102, 1103 and 1104 is less than half the wavelength of the transmitted communication signals. The antenna elements 1101, 1102, 1103 and 1104 are formed, for example, as simple λ/4 dipoles with a balun 1109, 1110, 1111 and 1112. Changeover switches 1107 and 1108 are used for the selection of the respective baseline 1105 and 1106, insofar as only one pair of antenna elements 1101, 1102, 1103 and 1104 is to be used to determine the direction. In this case, through selection of the respective other pair of antenna elements 1101, 1102, 1103 and 1104, the baseline can be changed over and a determination of the direction, unambiguous to 360°, can be undertaken. The switches 1107 and 1108 are SPDT (Single Pull Double Throw) switches.

Figure 12:
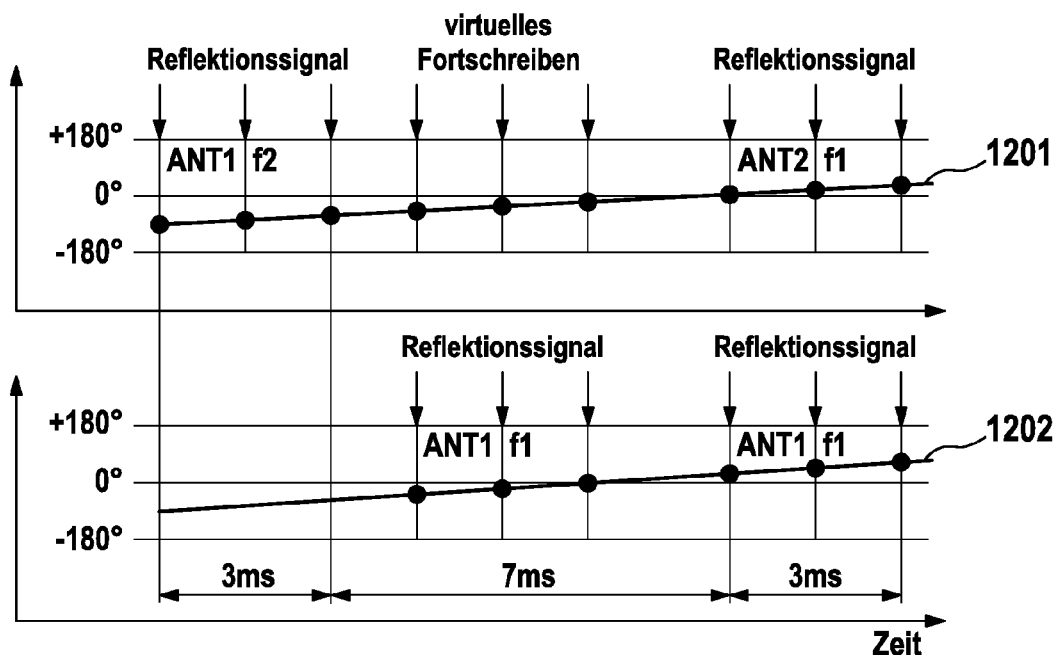
FIG. 12 shows the determination of two phases on an antenna arrangement having two antenna elements.

FIG. 12 shows the determination of two phases on an antenna arrangement which utilizes two antenna elements. The possible values of the phases range in each case from −180° to +180°. In the time window $t_1$, which has a duration of 3 ms, a reflection signal with the frequency f2 is sensed on the antenna element 1. Transmission takes place simultaneously via the antenna element 1 by means of a circulator. The phase 1201 is determined from the received reflection signal. The phase 1202 cannot be determined in the time window $t_2$, since the antenna 2 is temporarily unable to receive signals due to a changeover process. In the time window $t_2$, which lasts 7 ms, a frequency changeover to the frequency f1 takes place on the antenna element 1. The phase 1202 can now be determined by means of the frequency f1 now received on the antenna element 1. However, since no reflection signals are received at the frequency f1, the phase 1201 is virtually updated in the time window $t_2$. By means of the virtually updated phase at the frequency f2 and the determined phase at the frequency f1, a differential phase can now be determined from which the distance to the object which generates the reflection signals at the frequencies f1 and f2 can be determined via the Vernier method. In the time window $t_3$, the antenna 2 now receives reflection signals at the frequency f1 and the antenna 1 similarly receives reflection signals at the frequency f1. From the differential phase of the two antennas resulting from the spatial distance, the direction to the object which generates the reflection signals at the frequency f1 is now determined by means of the interferometer method.

Figure 13:
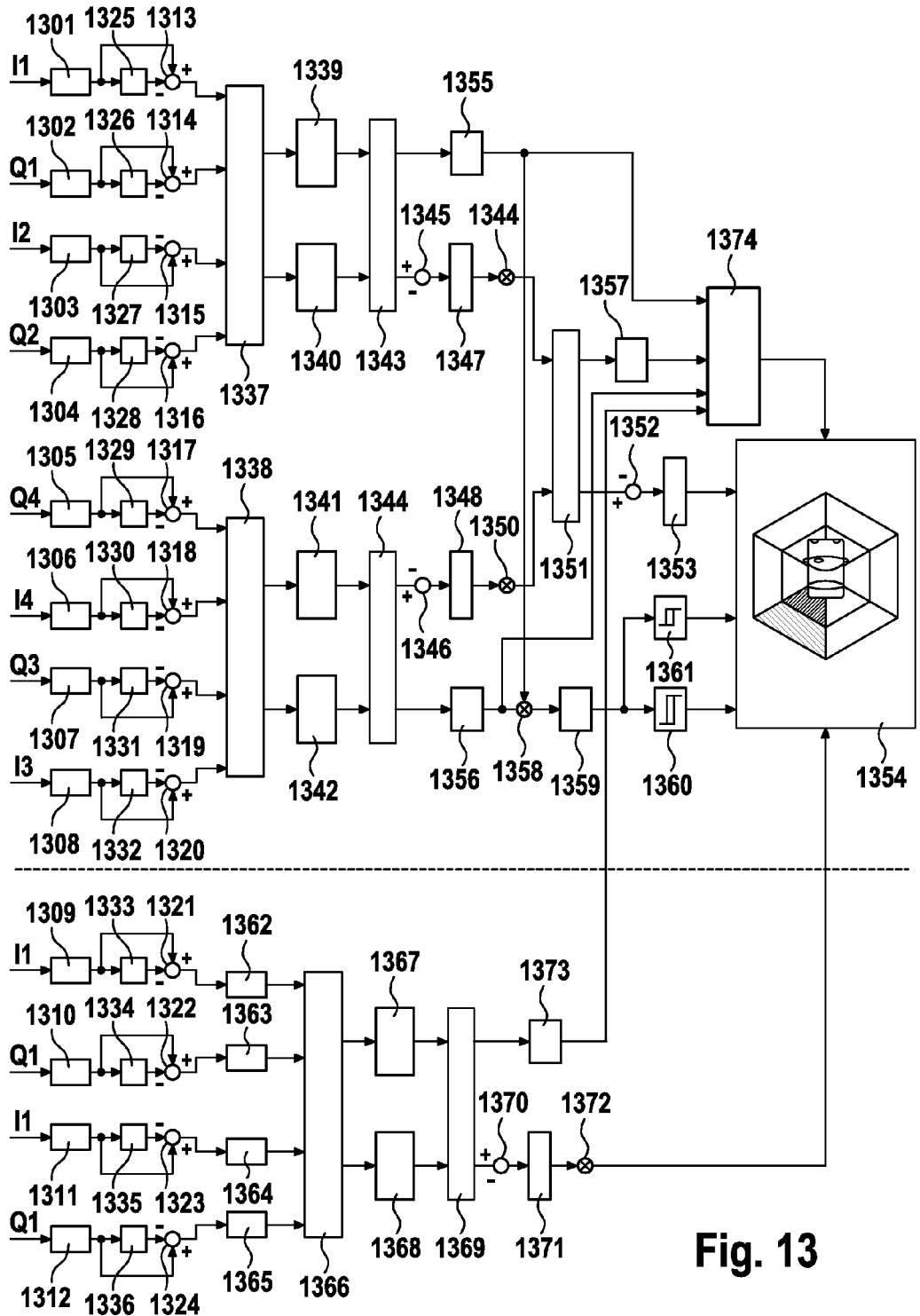
FIG. 13 shows an example of the structure of a device according to the invention for determining a distance and a direction.

FIG. 13 shows an example and schematic structure of a device according to the invention for determining a distance and a direction to an object as a block diagram. To do this, the reflection signals of a packet-based, pulsed continuous wave operating transceiver are evaluated. In the input stages 1301-1312, the analogized components I and Q are initially sampled and digitized. They still contain a random offset which can be removed through low-pass filtering. This functions because the relevant component of the phase, by way of example the Doppler phase, only changes slowly in comparison with the phase of the signal. The method selected by way of example for removing the direct component is the subtraction of a sliding mean value on subtracters 1313-1324, as it occurs at the output of the low-pass filters 1325-1336. The evaluation of the complex components I and Q is carried out by means of multipliers 1337 and 1338 through complex conjugate multiplication in pairs. The high-frequency components of the phases are thus removed here in that the e.g. left-rotating component Q1 is processed with the component Q2, which is right-rotating due to the complex conjugate, so that only the Doppler phase difference remains. At this point, the signal component which occurs due to the intrinsic movement of the vehicle is furthermore removed. This represents a substantial advantage of the phase differential method in that no ambient signals are evaluated which relate only to the intrinsic movement of the vehicle, since these occur more or less identically in the sensed reflection signals and are eliminated by the determination of the differential phase. Following these evaluation steps, the signals cannot yet be forwarded immediately to the arctan calculators 1343 and 1344, since the phase jumps by definition when it is inverted onto the −180° to +180° range. Since the components I and Q initially occur as a continuous sine component or cosine component, they can still be comparatively easily filtered, predicted and observed in this form. The components I and Q are initially filtered accordingly in filter modules 1339-1342 by means of a low-pass filter, are predicted, i.e. extrapolated into the future, and are finally filtered once more by means of a Kalman filter. The initial differential phase is in principle random and dependent on the employed line lengths, distances between the antenna elements and relative alignment of the antenna elements. It is therefore necessary to align the phases with one another in a one-off process. This is done, for example, by means of the alignment elements 1345 and 1346. Since each pair of antenna elements (inputs I1, I2, Q1, Q2) can carry out a determination of the direction unambiguously to 180° only, the unambiguity range is then extended to 360° by means of the second pair of antenna elements (inputs I3, I4, Q3, Q4). To do this, the phases are then inverted by means of phase inverters 1347 and 1348 to 360° and are then provided with an alignment constant by means of alignment modules 1349 and 1350 for the case where the pairs of antenna elements are not spaced exactly equally apart from one another. An arctan is subsequently again formed by means of a further arctan calculator 1351 from the components I and Q and a further complex conjugate multiplication is carried out. In this case, the values I2+jQ2 and I4+jQ4 are complex conjugate multiplied. The result of the complex conjugate multiplication is aligned once more by means of the further alignment element 1352. An inversion of the phase is then carried out once more by means of a further phase inverter 1353. This result represents the direction to a sensed object and is presented graphically to the driver in the output module 1354. As shown, the object is located to the left behind the vehicle.

The complex conjugate multiplication in the arctan calculators 1343, 1344 and 1351, together with the root calculators 1355, 1356 and 1357, serves to calculate an amount of the respective components I and Q which must have a minimum quantity in order to guarantee a useful evaluation. Transfer to the input signals, a minimum degree of signal-to-noise ratio must be maintained in terms of the noise limit of the receive module, wherein at least the amount of the Doppler frequency may also be significantly less than the effective value of the system noise due to the filtering in the filter modules 1339-1342. At the same time, the amount thus obtained, which indicates a limit value for the distance, is also suitable for a rough distance estimate, since the amount of the reflection signal decreases by the fourth power of the distance to the object. In order to form a mean value, the values formed by the root calculators 1355 and 1356 are multiplied by one another by means of the multiplier 1358 and the root of this product is again determined by means of the root calculator 1359. An approximation module 1360 compares the determined limit values for the distances with predefined warning thresholds, while the detection module 1361 compares the determined limit values for the distances with predefined detection thresholds. The determined limit values for the distances essentially depend on the radar cross section of the object. If both a detection threshold and a warning threshold are exceeded, this can be output graphically to the driver in the output module 1354.

Along with the rough estimation of the distance via the received power of the reflection signals, the precise distance to the object is then also determined by means of the Vernier method. To do this, the components I1 and Q1 from the same antenna elements are used, but at two different frequencies. Since, by way of example, the two different frequencies or the communication signals at these two different frequencies are transmitted temporally offset in relation to one another and therefore the reflection signals are received temporally offset in relation to one another, the device has buffer memories 1362-1365 which enable only a subsequent processing. The subsequent processing initially includes a multiplier 1366, followed by filter modules 1367 and 1368 (corresponding to filter modules 1339-1342), an arctan calculator 1369 and an alignment element 1370. A phase inverter 1371 then follows to invert the phase, and an equalizing module 1372. The determined distance is forwarded directly by the latter to an output module 1354 and is presented graphically to the driver.

Furthermore, the root of the output value of the arctan calculator 1369 is formed by the root calculator 1373. This root and the roots formed by the root calculators 1355, 1356 and 1357 are forwarded to a diagnosis module 1374. The diagnosis module 1374 compares these roots with one another and with an absolute threshold value and thus determines a current status of the device according to the invention. This status indicates whether and how reliable the determined distances and directions are.

Figure 14A:
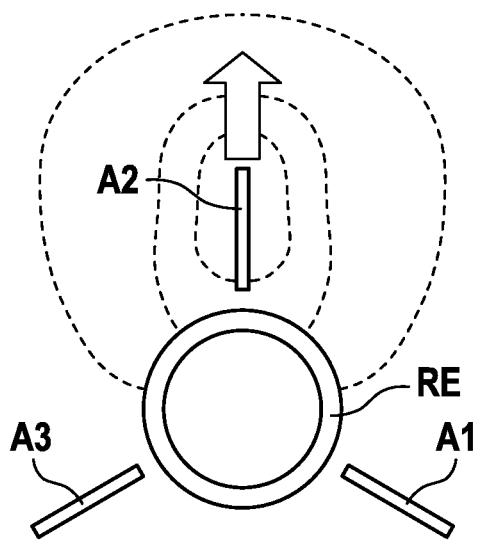
FIG. 14 shows an example embodiment of an antenna module with broadband Vivaldi elements arranged in the shape of a star.
Figure 14B:
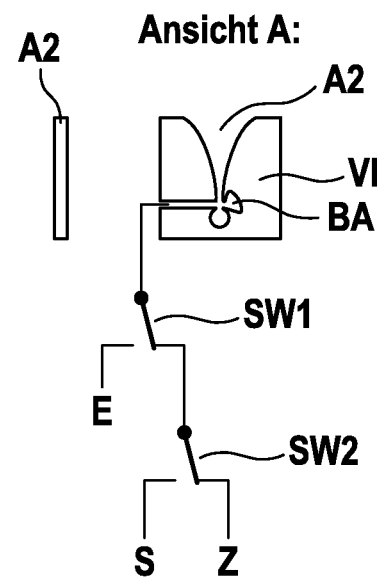

FIG. 14 shows an example embodiment of an antenna module with broadband Vivaldi elements A1, A2 and A3 arranged in a star shape and a central tube reflector RE. The Vivaldi elements A1, A2 and A3 are arranged in such a way that the two-dimensional Vivaldi horn VI (FIG. 1b) forms a mass area and is conductively connected to the reflector RE. A balun BA is connected at its base to a controllable switch cascade consisting of a switch SW1 and a switch SW2, wherein the receiver E undergoes minimal switch attenuation due to its proximity to the Vivaldi horn VI, whereas a controllable transmitter S and terminal resistor Z are disposed at the end of the cascade and undergo a correspondingly higher switch attenuation.

Figure 15:
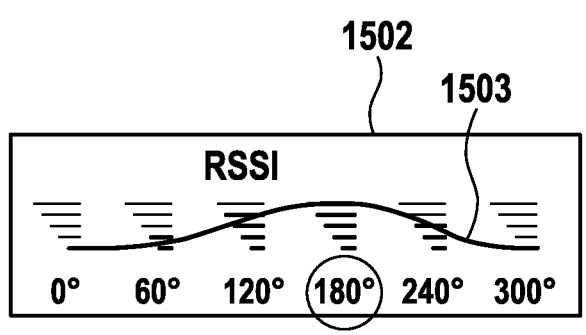
FIG. 15 shows an example of the evaluation of a received reflection signal or communication signal.
Figure 15:
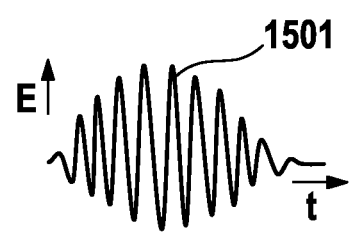
Figure 18:
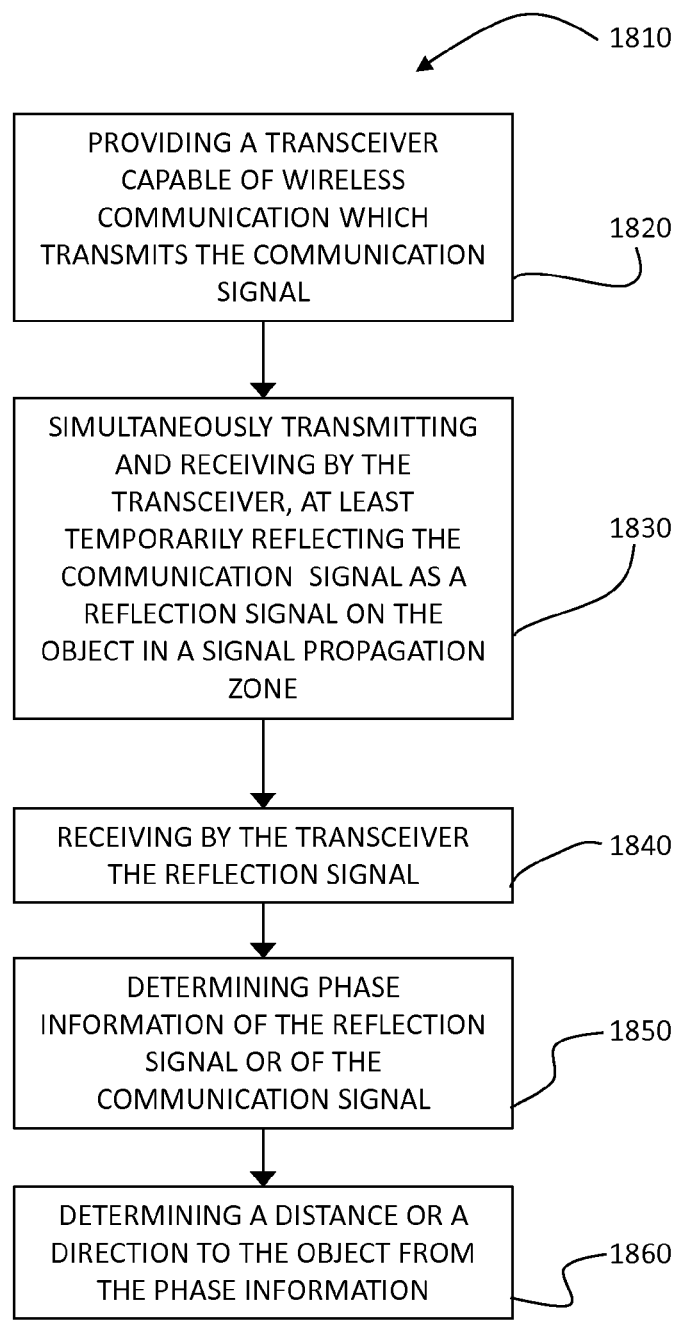
FIG. 18 illustrates a flowchart of a method for position determination of an object by means of a communication signal.

FIG. 15 shows an example of a direction evaluation by means of a directional characteristic of a received reflection signal or communication signal. The amplitude of a demodulated reflection signal 1501 is evaluated by means of Receive Signal Strength Indicators (RSSI) 1502. A simple envelope demodulation is carried out. Equally, a power measurement could also be carried out. For the comparatively more complex case of a phase evaluation, the reflection signals of at least two antenna elements would additionally be guided through controllable phase delay elements and then combined by directional couplers. Only thereafter would the RSSI evaluation take place.

FIG. 16a shows a further possible embodiment of an antenna arrangement according to the invention. Narrowband patch elements B1, B2, B3 and B4 are used in this embodiment. In this example, they are disposed separately for the transmit stage and the receive stage and are arranged in four spatial directions to form the surfaces of a cube. The individual patch B3 (FIG. 3b) consists of a metal back layer (not shown) and a front layer with a narrowband patch P for the transmit stage and the receive stage. At least the metal back layer is connected to electrical ground G. Here also, the feed lines are connected at the base to a switch cascade (see FIG. 14b). In the more complex case of a phase comparison, the feed lines would be connected at the base to controllable phase delay elements, a signal-combining directional coupler and an RSSI evaluation module. According to their geometry and shape, eight different assignments or directional characteristics DIR are obtained for the antenna arrangement shown in FIG. 16.

FIG. 17 shows two assignment tables 1701 and 1702. The assignment table 1701 contains an assignment and evaluation scheme for the antenna arrangement shown in FIG. 14, while the assignment table 1702 contains an assignment and evaluation scheme for the antenna arrangement shown in FIG. 16. The assignment table 1702 comprises eight different assignments or directional characteristics DIR and the assignment table 1701 comprises six different assignments or direction characteristics DIR. Depending on the assignment of the antenna elements A1, A2, A3 and B1, B2, B3, B4 to the transmitter module S, the receiver module E and the terminal resistor Z according to the assignment table 1701 or 1702, a combined directional characteristic of the total characteristic Gc is obtained from the combination of the transmit characteristic Sc and the receive characteristic Ec. The direction to the object then follows directly from a maximum (RSSI=max) of the RSSI curve 1503 in FIG. 15 over the assigned angle of direction DIR.

According to an example not shown, the method according to the invention is used as a method to protect against being blocked in by other vehicles. Particularly in cities, the problem often arises that a vehicle is blocked in a narrow parking space by other vehicles. This may, on the one hand, be signaled to the driver of the vehicle that has just been blocked in via a radio-link-enabled locking device, or, on the other hand, the blocked-in vehicle triggers an audible warning to make the parking vehicle aware that the blocked-in vehicle can no longer drive out of the parking space if the parking vehicle remains in its current position. As an alternative to an audible warning, the windshield-washing system of the blocked-in vehicle can be activated—a parking driver will normally keep a greater distance from a vehicle of this type suddenly activating the windshield-washing system for reasons of caution and safety.

According to a further example similarly not shown, the method according to the invention is used as a method for detecting an approach to the vehicle provided with the device according to the invention. It normally takes a while following entry into a vehicle before the vehicle electronics are ready for use. The driver is intended to notice this time span as little as possible, wherefore the time of activation of the vehicle electronics is brought forward as far as possible, e.g. to the time when the door is opened. With the method according to the invention, the driver can already be noticed as he approaches the vehicle and the vehicle electronics can already be activated at this time.

According to a further example similarly not shown, the method according to the invention is used to activate the alarm system only if someone approaches the vehicle in the parked condition. The alarm system can therefore be deactivated even if no one is located in the vicinity of the vehicle.

According to a further example not shown, the method according the invention is used to briefly activate a vehicle actuator, such as e.g. a window winder, if a person approaches the vehicle in the parked condition. The approaching person thus gains the impression that the owner of the vehicle is in the vicinity and is observing the scenario. This prevents vehicle theft.

According to a further example not shown, the method according the invention is used to protect cyclists, since an automobile driver in stop-and-go traffic is frequently surprised by cyclists overtaking on the right. Said cyclists approach from an unexpected direction, mainly in the blind spot, so that they can scarcely be given consideration. The method according to the invention can detect such an approach even before e.g. ultrasound sensors respond, as the cyclist can first be sensed from the vehicle roof where the antenna arrangement is normally disposed.

According to a further example not shown, the method according to the invention is used for blind-spot warning, whereby, if a vehicle approaches in the blind spot, it is sensed by means of the method according to the invention and a corresponding warning appears in the external mirror.

According to a further example not shown, the method according to the invention is used as a distance and speed regulator, whereby a vehicle travelling in front is sensed by means of the method according to the invention in the event of a close approach, whereupon the speed can be autonomously reduced to prevent a collision.

While the above description constitutes the preferred embodiment of the present invention, it will be appreciated that the invention is susceptible to modification, variation and change without departing from the proper scope and fair meaning of the accompanying claims.

The invention claimed is:

1. A method performed by a vehicle-to-X communication device being mounted in a vehicle for position determination of an object by means of a communication signal, comprising the steps of:
   providing a transceiver capable of wireless communication which transmits the communication signal, wherein the communication signal is a signal for vehicle-to-X communication,
   simultaneously transmitting and receiving by the transceiver, at least temporarily reflecting the communication signal as a reflection signal on the object in a signal propagation zone,
   receiving by the transceiver the reflection signal, determining phase information of the reflection signal or of the communication signal, determining a distance or a direction from the transceiver to the object from the phase information, wherein the phase information is in the form of differential phases of the reflection signal.

2. The method as claimed in claim 1 further comprising in that a received one of the reflection signal or a transmitted one of the communication signal is split up into a leading component and a trailing component, wherein the phase of the leading component remains unaffected and the phase of the trailing component is delayed by 90°.

3. The method as claimed in claim 1 further comprising determining the phase information in the form of differential phases by means of mixing of the communication signal with an associated reflection signal or by means of mixing of two different one of the reflection signal by means of complex conjugate multiplication or by means of crossover multiplication.

4. The method as claimed in claim 1 further comprising the transceiver transmitting communication signals on at least two different frequencies.

5. The method as claimed in claim 4, further comprising determining a distance to the object from the phase information generated by the at least two different frequencies.

6. The method as claimed in claim 4 further comprising determining the direction and the distance to the object by means of temporally alternating evaluation of the differential phases of two frequencies and the differential phases on two antenna elements.

7. The method as claimed in claim 4 further comprising in that the at least two frequencies are two different communication channels of a common communication means.

8. The method as claimed in claim 1 further comprising in that the communication signal and the reflection signal are received by at least two electrically independent antenna elements of the transceiver, wherein the phase information is determined by means of the at least two antenna elements.

9. The method as claimed in claim 8, further comprising receiving the communication signal and the reflection signal by means of four electrically independent antenna elements of the transceiver, and determining the phase information by means of the four antenna elements.

10. The method as claimed in claim 8 further comprising determining a direction to the object from the phase information generated by the at least two electrically independent antenna elements.

11. The method as claimed in claim 1 further comprising the transceiver communicating with communication participants in the form of traffic participants and with infrastructure devices.

12. The method as claimed in claim 11, further comprising in that the object is a traffic participant, including one or more of a, vehicle cyclists and a pedestrians, and at least one of an infrastructure device and a communication participant.

13. The method as claimed in claim 1 further comprising in that the transceiver in each case determines a Doppler frequency for the object in the signal propagation zone.

14. The method as claimed in claim 13, further comprising determining the Doppler frequency from a Doppler phase.

15. The method as claimed in claim 13 further comprising filtering the Doppler frequency by means of a digital low-pass filter.

16. The method as claimed in claim 1 further comprising producing a movement path of the object from a multiplicity of determined distances and directions.

17. The method as claimed in claim 1 further comprising in that data transported in a received communication signal is at least proportionally evaluated.

18. The method as claimed in claim 1 further comprising aligning a determined position of a communication participant with a position datum contained in a message sent by the communication participant and validating the position datum if it does not conflict with the determined position.

19. The method as claimed in claim 1 further comprising forwarding the transported data or the determined positions to at least one driver assistance system.

20. The method as claimed in claim 1 further comprising providing the driver assistance system configured to carry out an autonomous braking intervention or an autonomous steering intervention or a warning of a driver, or a distance and speed regulator.

21. The method as claimed in claim 1 further comprising the transceiver transmitting communication signals without information content or transmitting the communication signal of which information content remains valid in multiple succession.

22. The method as claimed in claim 1 further comprising evaluating a receive power of the reflection signal.

23. The method as claimed in claim 22, further comprising determining a class of the object from the distance and the received power.

24. The method as claimed in claim 1 further comprising determining the distance or the direction to the object from a ratio formed from an electromagnetic field strength received by at least two antenna elements.

25. The device as claimed in claim 1, wherein an angle of radiation of the communication signal is approximately 360 degrees.

26. A vehicle-to-X communication device being mounted in a vehicle for the communication-signal-based position determination of objects comprising:

a transceiver with a transmit module for the wireless transmission of communication signals and with a receive module for the wireless reception of communication signals and reflection signals, wherein the communication signals are signals for vehicle-to-X communication, wherein the reflection signals are at least partially reflected on objects in a propagation zone of the communication signals, wherein the transceiver is configured to be capable of simultaneous transmission and reception, wherein the transceiver comprises an antenna arrangement, the device configured to determine phase information of the reflection signals or the communication signals by means of phase evaluation means, and the device is configured to determine from the phase information a distance from the transceiver by means of distance determination means or a direction from the transceiver to the at least one object by a direction determination means.

27. The device as claimed in claim 26 further comprising in that the antenna arrangement consists of at least two antenna elements.

28. The device as claimed in claim 26 further comprising the antenna alignment includes antenna elements arranged into at least one of a multi-beam star, a polygon, are shaped as Vivaldi horns, surround a metal tube reflector radially, are shaped as narrowband patch elements, and are aligned in a back-to-back arrangement.

29. A use of the device as claimed in claim 26 in an infrastructure device or a traffic participant including at least one of a motor vehicle a motorcycle , a bicycle, a pedelec, and a pedestrian.

30. The device as claimed in claim 26, wherein the antenna arrangement has a directional characteristic for determining an incoming direction of the communication signals or the reflection signals.

31. The device as claimed in claim 30 further comprising in that the antenna elements are assignable via switching elements to the transmit module or to the receive module or to a terminal resistor and that the directional characteristic is defined by the assignment.

32. The device as claimed in claim 26, wherein an angle of radiation of the communication signals is approximately 360 degrees.

\* \* \* \* \*